US012779844B2

(12) United States Patent
Nakase et al.

(10) Patent No.: US 12,779,844 B2
(45) Date of Patent: Nov. 3, 2026

(54) LIQUID EJECTION APPARATUS

(71) Applicant: BROTHER KOGYO KABUSHIKI KAISHA, Nagoya (JP)

(72) Inventors: Takafumi Nakase, Nagoya (JP); Isao Kubo, Tokoname (JP); Ryuji Horata, Gamagori (JP); Nobumasa Tanaka, Nagoya (JP); Misaki Haruhara, Nagoya (JP); Tetsuya Saso, Nagoya (JP); Masahiro Hayashi, Anjo (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 116 days.

(21) Appl. No.: 18/886,035

(22) Filed: Sep. 16, 2024

(65) Prior Publication Data

US 2025/0091341 A1 Mar. 20, 2025

(30) Foreign Application Priority Data

Sep. 20, 2023 (JP) ................................ 2023-153892

(51) Int. Cl.
*B41J 2/045* (2006.01)
*B41J 2/165* (2006.01)

(52) U.S. Cl.
CPC ......... *B41J 2/0451* (2013.01); *B41J 2/04555* (2013.01); *B41J 2/16514* (2024.05); *B41J 2/1652* (2013.01); *B41J 2/16579* (2013.01)

(58) Field of Classification Search
CPC .. B41J 2/0451; B41J 2/04555; B41J 2/16514; B41J 2/1652; B41J 2/16579
See application file for complete search history.

(56) References Cited

U.S. PATENT DOCUMENTS

2010/0060682 A1* 3/2010 Akatsuka ............... B41J 2/2117 347/9
2021/0300022 A1 9/2021 Hayashi et al.
2021/0300030 A1 9/2021 Kubo
2021/0300047 A1 9/2021 Hayashi et al.

FOREIGN PATENT DOCUMENTS

JP 2021016023 A 2/2021
JP 2021154564 A 10/2021
JP 2021160216 A 10/2021
JP 2021160232 A 10/2021

* cited by examiner

*Primary Examiner* — Justin Seo
(74) *Attorney, Agent, or Firm* — Scully, Scott, Murphy & Presser, P.C.

(57) ABSTRACT

An inspection signal output circuit including an electrode. The inspection signal output circuit outputs an inspection signal indicating an electrical change in the electrode when a head is driven to eject liquid from a nozzle toward the electrode. A controller performs an inspection operation sequentially for a plurality of nozzles. The inspection operation includes driving the head to eject liquid from the nozzle toward the electrode, acquiring the inspection signal output from the inspection signal output circuit, and determining whether there is an abnormality in ejection of liquid in the nozzle based on the acquired inspection signal. The controller performs, as the inspection operation, a first-type inspection of acquiring the inspection signal in a first order for the plurality of nozzles, and a second-type inspection of acquiring the inspection signal in a second order for the plurality of nozzles. The second order is different from the first order.

20 Claims, 16 Drawing Sheets

| NOZZLE NUMBER | FIRST ORDER |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| ⋮ | ⋮ |
| N-3 | N-3 |
| N-2 | N-2 |
| N-1 | N-1 |
| N | N |

| NOZZLE NUMBER | NUMBER OF TIMES OF OCCURRENCE OF LEAKAGE | SECOND ORDER |
|---|---|---|
| 1 | 5 | N-4 |
| 2 | 4 | N-3 |
| 3 | 4 | N-2 |
| 4 | 6 | N-1 |
| 5 | 3 | N |
| 6 | 1 | 1 |
| 7 | 0 | 2 |
| 8 | 1 | 3 |
| 9 | 2 | 4 |
| 10 | 1 | 5 |
| 11 | 0 | 6 |
| 12 | 1 | 7 |
| ⋮ | ⋮ | ⋮ |
| N-3 | 6 | N-8 |
| N-2 | 5 | N-7 |
| N-1 | 4 | N-6 |
| N | 5 | N-5 |

FIG. 10

| NOZZLE NUMBER | NUMBER OF TIMES OF OCCURRENCE OF LEAKAGE | SECOND ORDER |
|---|---|---|
| 1 | 5 | $B_4$+1 |
| 2 | 4 | $B_3$+1 |
| 3 | 4 | $B_3$+2 |
| 4 | 6 | $B_5$+1 |
| 5 | 3 | $B_2$+1 |
| 6 | 1 | $B_0$+1 |
| 7 | 0 | 1 |
| 8 | 1 | $B_0$+2 |
| 9 | 2 | $B_1$+1 |
| 10 | 1 | $B_0$+3 |
| 11 | 0 | 2 |
| 12 | 0 | 3 |
| ⋮ | ⋮ | ⋮ |
| N-3 | 6 | N |
| N-2 | 5 | $B_5$-1 |
| N-1 | 4 | $B_3$+3 |
| N | 5 | $B_5$ |

FIG. 11

| NOZZLE NUMBER | LEAKAGE OCCURRED LAST TIME | SECOND ORDER |
|---|---|---|
| 1 | | N-7 |
| 2 | | N-6 |
| 3 | | N-5 |
| 4 | | N-4 |
| 5 | | N-3 |
| 6 | | N-2 |
| 7 | | N-1 |
| 8 | YES | N |
| 9 | | 1 |
| 10 | | 2 |
| 11 | | 3 |
| 12 | | 4 |
| ⋮ | | ⋮ |
| N-3 | | N-11 |
| N-2 | | N-10 |
| N-1 | | N-9 |
| N | | N-8 |

FIG. 12

| NOZZLE NUMBER | LEAKAGE OCCURRED LAST TIME | SECOND ORDER |
|---|---|---|
| 1 | | N-7 |
| 2 | | N-6 |
| 3 | | N-5 |
| 4 | YES | N-4 |
| 5 | | N-3 |
| 6 | | N-2 |
| 7 | | N-1 |
| 8 | | N |
| 9 | | 1 |
| 10 | | 2 |
| 11 | | 3 |
| 12 | | 4 |
| ⋮ | | ⋮ |
| N-3 | | N-11 |
| N-2 | | N-10 |
| N-1 | | N-9 |
| N | | N-8 |

FIG. 13

| INK COLOR | TOTAL NUMBER OF TIMES OF LEAKAGE |
|---|---|
| K | $D_K$ |
| Y | $D_Y$ |
| C | $D_C$ |
| M | $D_M$ |

FIG. 15

| NOZZLE NUMBER | LEAKAGE OCCURRED LAST TIME | SECOND ORDER |
|---|---|---|
| 1 | | N−1 |
| 2 | YES | N |
| 3 | | N−2 |
| 4 | | N−3 |
| 5 | | N−4 |
| 6 | | N−5 |
| 7 | | N−6 |
| 8 | | N−7 |
| 9 | | N−8 |
| 10 | | N−9 |
| 11 | | N−10 |
| 12 | | N−11 |
| ⋮ | | ⋮ |
| N−3 | | 4 |
| N−2 | | 3 |
| N−1 | | 2 |
| N | | 1 |

| NOZZLE NUMBER | LEAKAGE OCCURRED LAST TIME | SECOND ORDER |
|---|---|---|
| 1(K) | | (3/4)N+1 |
| 2(CL) | | 1 |
| 3(CL) | | 2 |
| 4(CL) | | 3 |
| 5(K) | YES | (3/4)N+2 |
| 6(CL) | | 4 |
| 7(CL) | | 5 |
| 8(CL) | | 6 |
| 9(K) | | (3/4)N+3 |
| 10(CL) | | 7 |
| 11(CL) | | 8 |
| 12(CL) | | 9 |
| ⋮ | | ⋮ |
| N-3(K) | | N |
| N-2(CL) | | (3/4)N-2 |
| N-1(CL) | | (3/4)N-1 |
| N(CL) | | (3/4)N |

| NOZZLE NUMBER | LEAKAGE OCCURRED LAST TIME | SECOND ORDER |
|---|---|---|
| 1(K) | | 1 |
| 2(CL) | | (1/4)N+1 |
| 3(CL) | | (1/4)N+2 |
| 4(CL) | | (1/4)N+3 |
| 5(K) | | 2 |
| 6(CL) | YES | (1/4)N+4 |
| 7(CL) | | (1/4)N+5 |
| 8(CL) | | (1/4)N+6 |
| 9(K) | | 3 |
| 10(CL) | | (1/4)N+7 |
| 11(CL) | | (1/4)N+8 |
| 12(CL) | | (1/4)N+9 |
| ⋮ | | ⋮ |
| N-3(K) | | (1/4)N |
| N-2(CL) | | N-2 |
| N-1(CL) | | N-1 |
| N(CL) | | N |

| NOZZLE NUMBER | Z-TH ORDER |
|---|---|
| 1 | N−(Z−1)×Y+1 |
| 2 | N−(Z−1)×Y+2 |
| 3 | N−(Z−1)×Y+3 |
| 4 | N−(Z−1)×Y+4 |
| ⋮ | ⋮ |
| (Z−1)×Y−1 | N−1 |
| (Z−1)×Y | N |
| (Z−1)×Y+1 | 1 |
| (Z−1)×Y+2 | 2 |
| (Z−1)×Y+3 | 3 |
| ⋮ | ⋮ |
| N−3 | N−(Z−1)×Y−3 |
| N−2 | N−(Z−1)×Y−2 |
| N−1 | N−(Z−1)×Y−1 |
| N | N−(Z−1)×Y |

FIG. 24

| NOZZLE NUMBER | NUMBER OF TIMES OF OCCURRENCE OF LEAKAGE | ACQUIRE INSPECTION SIGNAL (DETERMINATION INFORMATION) |
|---|---|---|
| 1 | 5 | NO |
| 2 | 4 | YES |
| 3 | 4 | YES |
| 4 | 6 | NO |
| 5 | 3 | YES |
| 6 | 1 | YES |
| 7 | 0 | YES |
| 8 | 1 | YES |
| 9 | 2 | YES |
| 10 | 1 | YES |
| 11 | 0 | YES |
| 12 | 1 | YES |
| ⋮ | ⋮ | ⋮ |
| N-3 | 6 | NO |
| N-2 | 5 | NO |
| N-1 | 4 | YES |
| N | 5 | NO |

LIQUID EJECTION APPARATUS

REFERENCE TO RELATED APPLICATIONS

This application claims priority from Japanese Patent Application No. 2023-153892 filed on Sep. 20, 2023. The entire content of the priority application is incorporated herein by reference.

BACKGROUND ART

As an example of a liquid ejection apparatus that ejects liquid from nozzles, a printer that performs recording by ejecting ink from nozzles is known.

SUMMARY

In a printer, a plurality of nozzles of an inkjet head and an electrode disposed in a cap are arranged to face each other, and the inkjet head is driven such that ink is ejected from each of the plurality of nozzles toward the electrode, thereby determining whether the nozzle is an abnormal nozzle. When a leakage occurs between the inkjet head and the electrode while it is determined whether the nozzle is abnormal, the determination of whether the nozzle is an abnormal nozzle is stopped.

In the printer, in a case where a leakage occurs when the determination of whether any of the nozzles is an abnormal nozzle is performed, the determination of whether the nozzle is an abnormal nozzle is not performed for the nozzles for which the determination of whether the nozzle is an abnormal nozzle is scheduled to be performed thereafter.

In view of the foregoing, an example of an object of this disclosure is to provide a liquid ejection apparatus configured to reduce the number of nozzles for which it is not determined whether there is an abnormality.

According to one aspect, this specification discloses a liquid ejection apparatus. The liquid ejection apparatus includes a head, an inspection signal output circuit, and a controller. The head includes a plurality of nozzles. The inspection signal output circuit includes an electrode. The inspection signal output circuit is configured to output an inspection signal indicating an electrical change in the electrode when the head is driven to eject liquid from a nozzle toward the electrode. The nozzle is among the plurality of nozzles. The controller is configured to perform an inspection operation sequentially for the plurality of nozzles. The inspection operation including driving the head to eject liquid from the nozzle toward the electrode, acquiring the inspection signal output from the inspection signal output circuit, and determining whether there is an abnormality in ejection of liquid in the nozzle based on the acquired inspection signal. Thus, the controller drives the head to eject liquid from the nozzle toward the electrode sequentially for the plurality of nozzles. The controller acquires the inspection signal output from the inspection signal output circuit. The controller determines whether there is an abnormality in ejection of liquid in the nozzle based on the acquired inspection signal. The controller is configured to, as the inspection operation, perform: a first-type inspection of acquiring the inspection signal in a first order for the plurality of nozzles, and a second-type inspection of acquiring the inspection signal in a second order for the plurality of nozzles. The second order is different from the first order. Thus, the plurality of nozzles are inspected in different orders between the first-type inspection and the second-type inspection.

According to the present disclosure, in the inspection operation, the first-type inspection of acquiring the inspection signal in a first order for the plurality of nozzles and the second-type inspection of acquiring the inspection signal in a second order for the plurality of nozzles are performed. Thus, in the inspection operation, when either the first-type inspection or the second-type inspection is performed according to conditions, the inspection signal for the plurality of nozzles is acquired by changing the order. Thus, when the inspection operation is repeatedly performed, the inspection signals are equally acquired for the plurality of nozzles, and the number of nozzles for which the inspection signal is not acquired is reduced.

BRIEF DESCRIPTION OF DRAWINGS

FIG. 10 is a diagram for explaining a second order in which inspection signals are acquired in order from a nozzle with the smallest number of times of leakage occurrence.

FIG. 11 is a diagram for explaining an example of a second order of first acquiring inspection signals for nozzles other than nozzles in which leakage has occurred in the previous inspection operation.

FIG. 12 is a diagram for explaining an example of a second order of first acquiring inspection signals for nozzles for which inspection signals are scheduled to be acquired after a particular number of nozzles from a nozzle in which leakage has occurred in the previous inspection operation.

FIG. 13 is a diagram for explaining the total number of times of leakage for each nozzle array.

FIG. 15 is a diagram for explaining an example of a second order in which inspection signals are acquired in order from a nozzle that is far from the nozzle in which leakage has occurred in the previous inspection operation.

FIG. 24 is a diagram for explaining an example in which nozzles having a large number of times of leakage occurrence are excluded from the target of acquisition of the inspection signal.

DESCRIPTION

Hereinafter, an embodiment of the present disclosure will be described.

Figure 1:
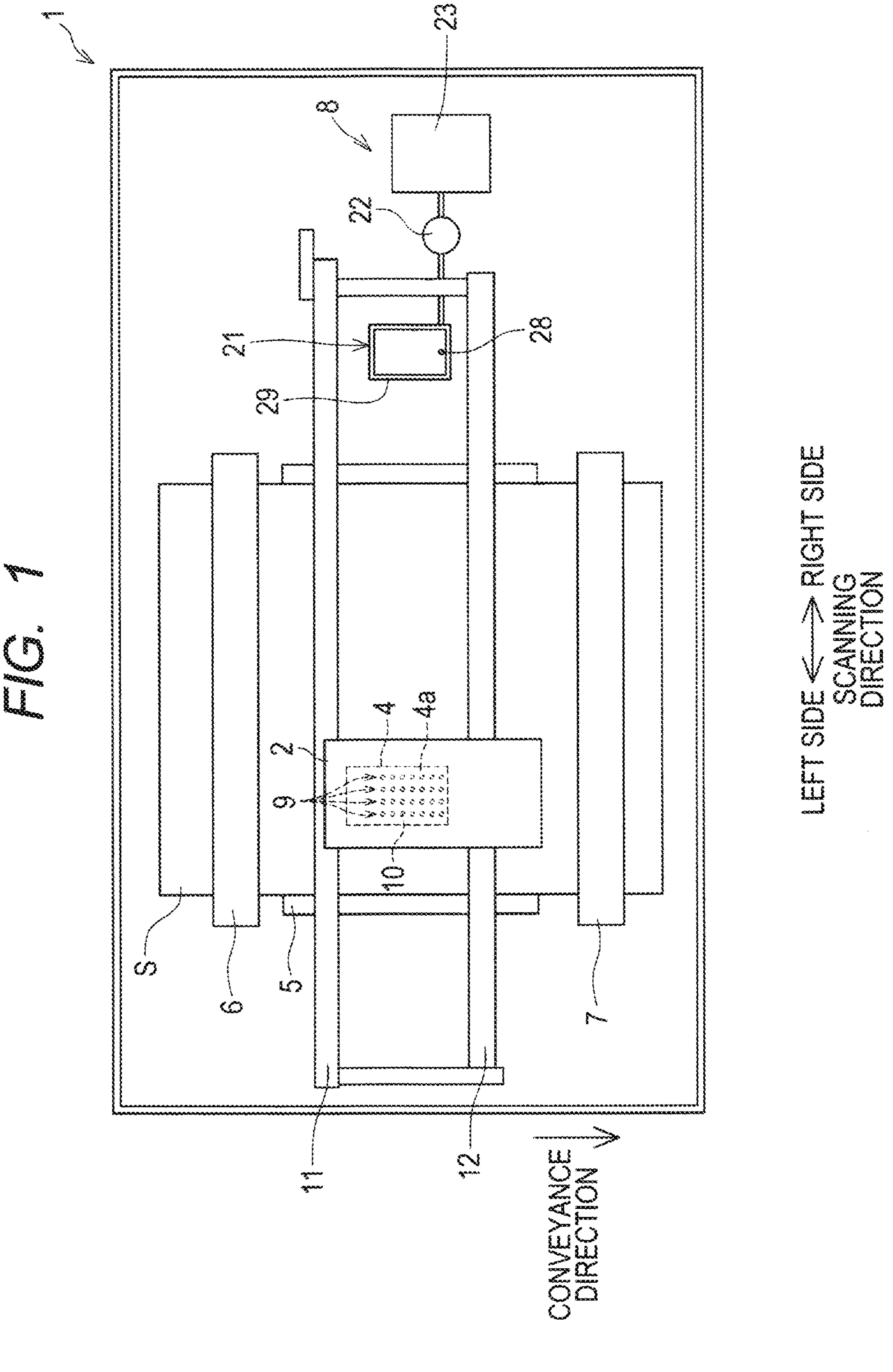
FIG. 1 is a schematic configuration diagram of a printer.

An overall configuration of a printer 1 will be described. As shown in FIG. 1, the printer 1 according to the present embodiment includes a carriage 2, an inkjet head 4, a platen 5, conveyance rollers 6 and 7, a maintenance unit 8, and so on. In the present embodiment, the printer 1 is an example of "liquid ejection apparatus" of the present disclosure. In the present embodiment, the inkjet head 4 is an example of "liquid ejection head" of the present disclosure. In the present embodiment, the maintenance unit 8 is an example of "purge unit" of the present disclosure.

The carriage 2 is supported by two guide rails 11, 12 extending in a scanning direction. The carriage 2 is connected to a carriage motor 36 shown in FIG. 3 via a belt (not shown) and so on. When the carriage motor 36 is driven, the carriage 2 moves in the scanning direction along the guide rails 11, 12. In the following description, the right side and the left side in the scanning direction are defined as shown in FIG. 1.

The inkjet head 4 is mounted on the carriage 2. The inkjet head 4 ejects ink from a plurality of nozzles 10 formed in a nozzle surface 4*a* which is a lower surface of the inkjet head 4. More specifically, the plurality of nozzles 10 are arranged in a conveyance direction orthogonal to the scanning direction to form the nozzle arrays 9, and four nozzle arrays 9 are arranged in the scanning direction in the nozzle surface 4*a*. The plurality of nozzles 10 eject black, yellow, cyan, and magenta inks in order from the nozzle array 9 on the right side in the scanning direction. The inkjet head 4 is connected to four ink cartridges (not shown) via tubes (not shown). The ink of the four colors is supplied from the four ink cartridges to the inkjet head 4.

The platen 5 is disposed below the inkjet head 4 and faces the plurality of nozzles 10. The platen 5 extends over an entire length of a recording sheet (recording paper) S in the scanning direction and supports the recording sheet S from below. The conveyance roller 6 is disposed upstream of the inkjet head 4 and the platen 5 in the conveyance direction. The conveyance roller 7 is disposed downstream of the inkjet head 4 and the platen 5 in the conveyance direction. The conveyance rollers 6 and 7 are connected to a conveyance motor 37 shown in FIG. 3 via gears (not shown). When the conveyance motor 37 is driven, the conveyance rollers 6 and 7 rotate, and the recording sheet S is conveyed in the conveyance direction.

The maintenance unit 8 includes a cap 21, a suction pump 22, and a waste liquid tank 23. The cap 21 is disposed on the right side of the platen 5 in the scanning direction. The cap 21 has a lip 29. The lip 29 protrudes upward and extends over an entire periphery of an outer edge of the cap 21. A discharge port 28 for discharging ink is provided at a downstream end of a portion surrounded by the lip 29 of the cap 21 in the conveyance direction. When the carriage 2 is located at a maintenance position on the right side of the platen 5 in the scanning direction, the plurality of nozzles 10 face the portion surrounded by the lip 29 of the cap 21.

Figure 3:
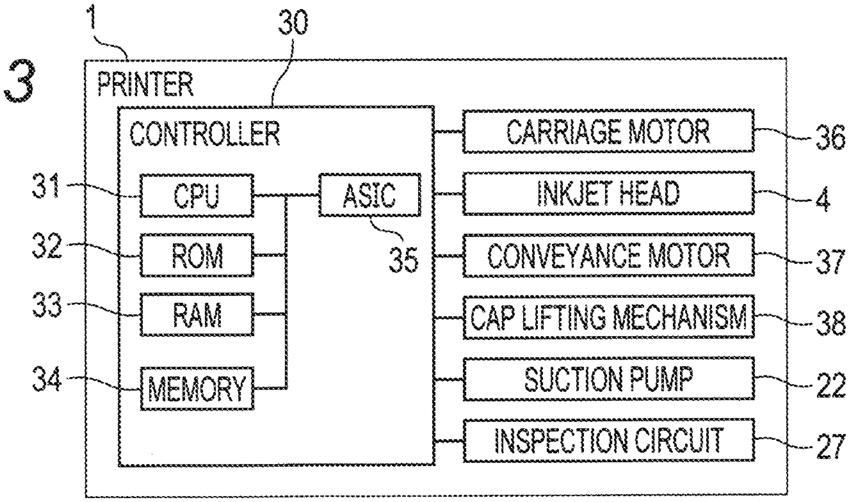
FIG. 3 is a block diagram showing an electrical configuration of the printer.

The cap 21 is raised and lowered by a cap lifting mechanism (cap lifter) 38 shown in FIG. 3. In a state where the carriage 2 is located at the maintenance position and the plurality of nozzles 10 and the cap 21 face each other, when the cap 21 is lifted by the cap lifting mechanism 38, the lip 29 is brought into close contact with the nozzle surface 4*a*, and the plurality of nozzles 10 are in a capped state where the nozzles 10 are covered with the cap 21. In a state where the cap 21 is lowered by the cap lifting mechanism 38, the plurality of nozzles 10 are in an uncapped state where the nozzles 10 are not covered by the cap 21. The cap 21 is not limited to the cap that covers the plurality of nozzles 10 by the lip 29 being in close contact with the nozzle surface 4*a*. For example, the cap 21 may cover the plurality of nozzles 10 by the lip 29 being in close contact with a frame and so on (not shown) disposed around the nozzle surface 4*a* of the inkjet head 4.

The suction pump 22 is a tube pump and so on, and is connected to the discharge port 28 of the cap 21 and the waste liquid tank 23. In the maintenance unit 8, when the suction pump 22 is driven in the capped state, the ink in the inkjet head 4 is discharged from the plurality of nozzles 10, that is, so-called suction purge is performed. The ink discharged by the suction purge is stored in the waste liquid tank 23.

Here, for convenience, the cap 21 collectively covers all the nozzles 10, and the ink in the inkjet head 4 is discharged from all the nozzles 10 in the suction purge. However, the present disclosure is not limited to this. For example, the cap 21 may include a portion covering the plurality of nozzles 10 constituting the rightmost nozzle array 9 for ejecting black ink and a portion covering the plurality of nozzles 10 constituting the three nozzle arrays 9 on the left for ejecting yellow, cyan, and magenta inks which are color inks, separately, and may be configured to selectively discharge either the black ink or the color inks in the inkjet head 4 in the suction purge. Alternatively, for example, the cap 21 may be provided individually for each nozzle array 9, and the ink may be discharged from the nozzles 10 individually for each nozzle array 9 in the suction purge.

In the maintenance unit 8, when the suction pump 22 is driven in the uncapped state, suction in the uncapped state is performed in which the ink accumulated in the cap 21 by suction purge, ejection driving described later, and so on is discharged from the discharge port 28. The ink discharged from the cap 21 by the suction in the uncapped state is also stored in the waste liquid tank 23.

Figure 2:
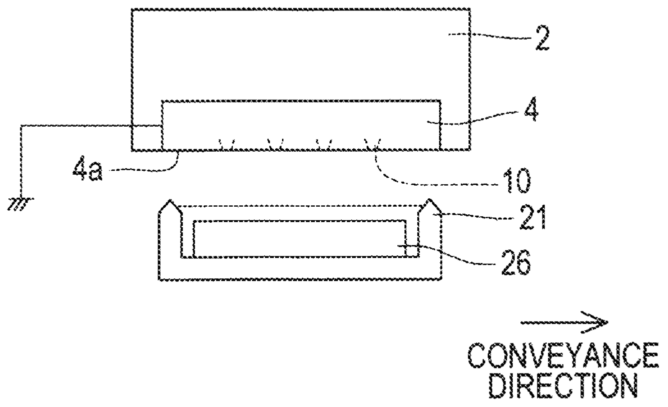
FIG. 2 is a view for explaining an electrode and so on arranged in a cap.

As shown in FIG. 2, an electrode 26 having a rectangular planar shape is disposed in the cap 21. The electrode 26 constitutes an inspection circuit 27 shown in FIGS. 3 and 4. The inspection circuit 27 is controlled by a controller 30 shown in FIGS. 3 and 4. In the present embodiment, in the capped state and in a state where a potential difference is generated between the inkjet head 4 and the electrode 26 as described later, it is inspected whether ink is normally ejected from the nozzle 10 based on a change in the voltage of the electrode 26 when the inkjet head 4 is driven to eject ink from the nozzle 10 (ejection driving).

Next, an electrical configuration of the printer I will be described. As shown in FIG. 3, the printer 1 includes the controller 30. The controller 30 includes a CPU 31, a ROM 32, a RAM 33, a memory 34, an ASIC 35, and so on. The controller 30 controls the operations of the carriage motor 36, the inkjet head 4, the conveyance motor 37, the cap lifting mechanism 38, the suction pump 22, the inspection circuit 27, and so on. The controller 30 receives a signal from the inspection circuit 27.

The controller 30 may be configured such that the CPU 31 performs various processes, the ASIC 35 performs various processes, or the CPU 31 and the ASIC 35 perform various processes in cooperation with each other. The controller 30 may be configured such that one CPU 31 performs processes independently or a plurality of CPUs 31 perform processes in a shared manner. The controller 30 may be configured such that one ASIC 35 performs processes independently or a plurality of ASICs 35 perform processes in a shared manner.

Figure 4:
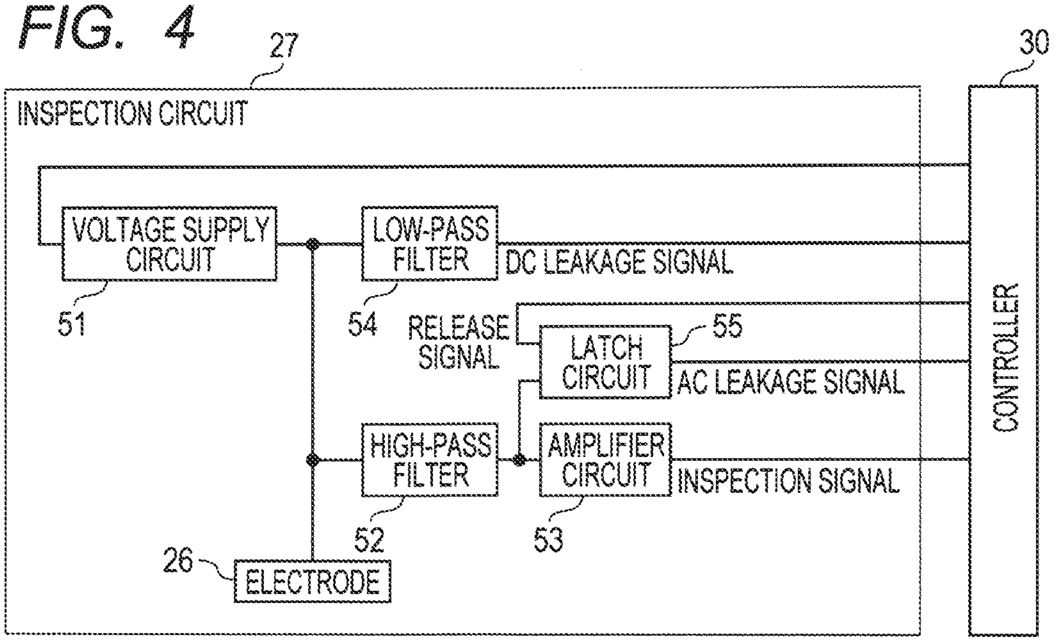
FIG. 4 is a block diagram showing a configuration of an inspection circuit.

Next, the inspection circuit 27 will be described. As shown in FIG. 4, the inspection circuit 27 includes the electrode 26, a voltage supply circuit 51, a high-pass filter 52, an amplifier circuit 53, a low-pass filter 54, and a latch circuit 55.

The voltage supply circuit 51 is controlled by the controller 30 to apply a voltage to the electrode 26, thereby generating a potential difference between the inkjet head 4 and the electrode 26.

The high-pass filter 52 has one end connected between the voltage supply circuit 51 and the electrode 26. The amplifier circuit 53 is connected to the other end of the high-pass filter 52. When a voltage fluctuation occurs in the electrode 26 located on the upstream side of the high-pass filter 52 in the voltage supply, a direct-current (DC) component of the voltage is removed by the high-pass filter 52 on the downstream side of the high-pass filter 52 in the voltage supply. The voltage passed through the high-pass filter 52 is amplified by the amplifier circuit 53 and is output as an inspection signal. Thus, the inspection signal is a signal acquired by amplifying a high-frequency component of the voltage of the electrode 26.

Here, a description will be given for the voltage of the electrode 26 when the inkjet head 4 is caused to perform the ejection driving for ejecting ink from the nozzle 10 in the capped state and in a state where and a potential difference is generated between the inkjet head 4 and the electrode 26 by applying a voltage to the electrode 26 by the voltage supply circuit 51. When ink is normally ejected from the nozzle 10 by the ejection driving, the voltage of the electrode 26 changes. The voltage of the electrode 26 changes rapidly at this time. In contrast, when the amount of ink from the nozzle 10 by the ejection driving is smaller than that in the normal state, the change in the voltage of the electrode 26 is smaller than that in the normal state. Here, that the amount of ink from the nozzle 10 by the ejection driving is smaller than that in the normal state includes that ink is not ejected. When ink is not ejected from the nozzle 10 by the ejection driving, the voltage of the electrode 26 does not change much (almost constant). From these, the high-frequency component of the voltage of the electrode 26 differs depending on whether the ink is normally ejected from the nozzle 10 by the ejection driving.

Figure 5A:
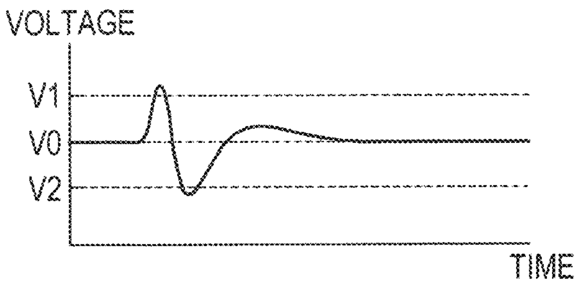
FIG. 5A is a diagram for explaining an inspection signal when ink is ejected from a nozzle by ejection driving.

As shown in FIG. 5A, when ink is normally ejected from the nozzle 10 by the ejection driving, the voltage of the inspection signal output from the amplifier circuit 53 changes with respect to V0. For example, V0 is a voltage close to a ground potential. However, the amount of change in the voltage of the electrode 26 when ink is ejected from the nozzle 10 by the ejection driving is smaller than the amount of change in the voltage of the electrode 26 when an AC leakage occurs in which a current of a particular value or more temporarily flows between the inkjet head 4 and the electrode 26 as will be described later. Thus, in the present embodiment, the signal output from the high-pass filter 52 is amplified by the amplifier circuit 53 and is output as the inspection signal.

Figure 5B:
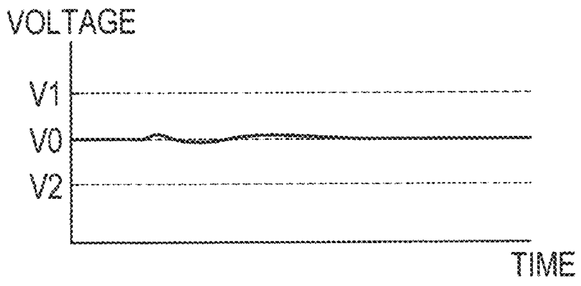
FIG. 5B is a diagram for explaining an inspection signal when ink is not ejected from a nozzle by ejection driving.

As shown in FIG. 5B, when the amount of ink ejected from the nozzle 10 by the ejection driving is smaller than that in the normal state, the change in the voltage of the inspection signal output from the amplifier circuit 53 with respect to V0 is smaller than that when ink is normally ejected from the nozzle 10 by the ejection driving.

Thus, the inspection signal is a signal indicating whether ink is normally ejected from the nozzle 10 by the ejection driving.

The low-pass filter 54 has one end connected between the voltage supply circuit 51 and the electrode 26. The low-pass filter 54 outputs, from the other end thereof, a signal from which a high-frequency component is removed with respect to the fluctuation of the voltage of the electrode 26, as a DC leakage signal. That is, the DC leakage signal is mainly a signal of a direct current (DC) component of the voltage of the electrode 26.

For example, when the inkjet head 4 and the electrode 26 are connected to each other via the ink in the cap 21, a DC leakage may occur in which a current larger than or equal to a particular value continuously flows between the inkjet head 4 and the electrode 26. When the DC leakage occurs between the inkjet head 4 and the electrode 26, a current continues to flow between the inkjet head 4 and the electrode 26, and the magnitude of the voltage of the electrode 26 decreases.

Figure 6:
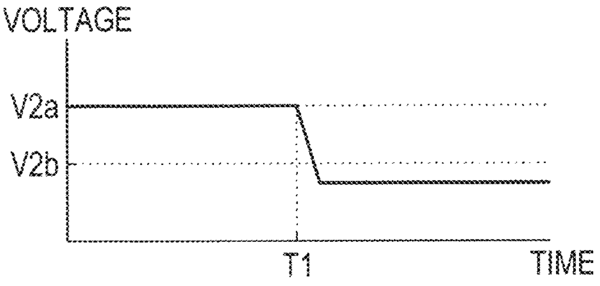
FIG. 6 is a diagram for explaining a DC leakage signal.

Thus, as shown in FIG. 6, in a state where the DC leakage does not occur between the inkjet head 4 and the electrode 26, a magnitude |V2| of a voltage V2 of the DC leakage signal output from the low-pass filter 54 is approximately equal to a voltage V2*a* (V2*a*>0). In a state where the DC leakage occurs between the inkjet head 4 and the electrode 26, the magnitude |V2| of the voltage V2 of the DC leakage signal output from the low-pass filter 54 is smaller than a voltage V2*b* (<V2*a*). FIG. 6 shows a case where the DC leakage does not occur between the inkjet head 4 and the electrode 26 until time T1, and the DC leakage occurs between the inkjet head 4 and the electrode 26 from the time T1.

Thus, the DC leakage signal is a signal indicating whether the DC leakage is occurring between the inkjet head 4 and the electrode 26.

The latch circuit 55 is connected to the other end of the high-pass filter 52 in parallel with the amplifier circuit 53. The latch circuit 55 receives a signal acquired by removing a direct current component (that is, a high voltage component applied by the voltage supply circuit 51) from the voltage of the electrode 26 by the high-pass filter 52. The latch circuit 55 is configured to output a signal when a voltage higher than or equal to a particular voltage is input, and not to output a signal when a voltage lower than the particular voltage is input. Once the signal is output, the latch circuit 55 holds the output. The output of the latch circuit 55 continues until a release signal instructing release of the output is received from the controller 30.

For example, when an AC leakage occurs in which a current of a particular value or more temporarily flows between the inkjet head 4 and the electrode 26 due to an electrical discharge temporarily occurring in a gap between the ink in the cap 21 and the nozzle surface 4*a*, a temporary change occurs in voltage of the electrode 26. When the AC leakage occurs between the inkjet head 4 and the electrode 26, the temporary change in the voltage of the electrode 26 is rapid. Thus, the high-frequency component of the voltage of the electrode 26 differs depending on whether the AC leakage occurs between the inkjet head 4 and the electrode 26. The amount of change in the voltage of the electrode 26 at this time is larger than the amount of change in the voltage of the electrode 26 when ink is ejected from the nozzle 10 by the ejection driving.

Figure 7A:
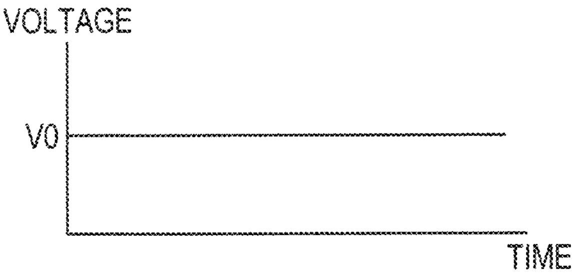
FIG. 7A is a diagram for explaining a signal received by a latch circuit when an AC leakage does not occur.
Figure 7B:
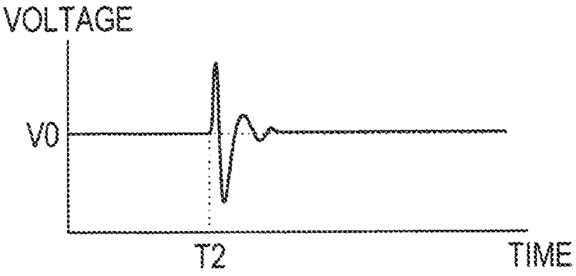
FIG. 7B is a diagram for explaining a signal received by the latch circuit when an AC leakage occurs.

Thus, as shown in FIG. 7A, when the AC leakage does not occur between the inkjet head 4 and the electrode 26, the voltage of the signal output from the high-pass filter 52 and received by the latch circuit 55 does not change much (almost constant). Thus, the latch circuit 55 does not output a signal. In contrast, as shown in FIG. 7B, when the AC leakage occurs between the inkjet head 4 and the electrode 26, the voltage of the signal received by the latch circuit 55 temporarily changes. This change in voltage is for a short time.

When a change in voltage occurs in the signal received by the latch circuit 55 due to the occurrence of the AC leakage between the inkjet head 4 and the electrode 26, the latch circuit 55 outputs a signal and holds the state. Thus, as shown in FIG. 7C, for example, the AC leakage signal output from the latch circuit 55 is such a signal that the voltage is V0 when the AC leakage does not occur between the inkjet head 4 and the electrode 26, and the voltage is V3*a* (>V0) when the AC leakage occurs between the inkjet head 4 and the electrode 26, and the output of the signal is maintained.

Figure 7C:
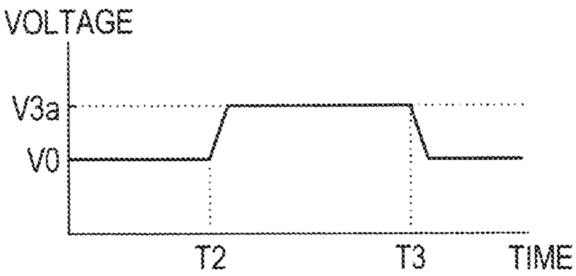
FIG. 7C is a diagram for explaining an AC leakage signal.

Here, FIGS. 7B and 7C show a case where the AC leakage occurs between the inkjet head 4 and the electrode 26 at time T2. In a case where the AC leakage continuously occurs between the inkjet head 4 and the electrode 26, the signal output from the latch circuit 55 is such that the voltage is continuously V3*a*. The controller 30 outputs a release signal in response to determining that it is not necessary to hold the output of the latch circuit 55, and the latch circuit 55 receives the release signal from the controller 30. In response to receiving the release signal, the latch circuit 55 stops output of the latch signal. FIG. 7C shows a case where the latch circuit 55 receives the release signal at time T3 after time T2.

Thus, the AC leakage signal output from the latch circuit 55 is a signal indicating whether the AC leakage has occurred between the inkjet head 4 and the electrode 26.

In the present embodiment, a portion of the inspection circuit 27 including the electrode 26, the voltage supply circuit 51, the high-pass filter 52, and the amplifier circuit 53 is an example of "inspection signal output circuit" of the present disclosure. In the present embodiment, a portion of the inspection circuit 27 including the electrode 26, the voltage supply circuit 51, the low-pass filter 54, the high-pass filter 52, and the latch circuit 55 is an example of "leakage signal output circuit" of the present disclosure. Further, among the portion constituting the leakage signal output circuit of the inspection circuit 27, a portion including the electrode 26, the voltage supply circuit 51, and the low-pass filter 54 is an example of "DC leakage signal output circuit" of the present disclosure. Further, among the portion constituting the leakage signal output circuit of the inspection circuit 27, a portion including the electrode 26, the voltage supply circuit 51, the high-pass filter 52, and the latch circuit 55 is an example of "AC leakage signal output circuit" of the present disclosure.

Next, the flow of processing by the controller 30 when an inspection instruction signal to instruct inspection of the plurality of nozzles 10 of the inkjet head 4 is received will be described. For example, when a user operates an operation interface (not shown) of the printer 1, a PC connected to the printer, and so on to instruct inspection of the nozzles 10, an inspection instruction signal is sent from the operation interface of the printer 1, the PC, and so on, and the controller 30 receives this inspection instruction signal. In response to receiving the inspection instruction signal, the controller 30 performs the processing according to the flowchart of FIG. 8.

Figure 8:
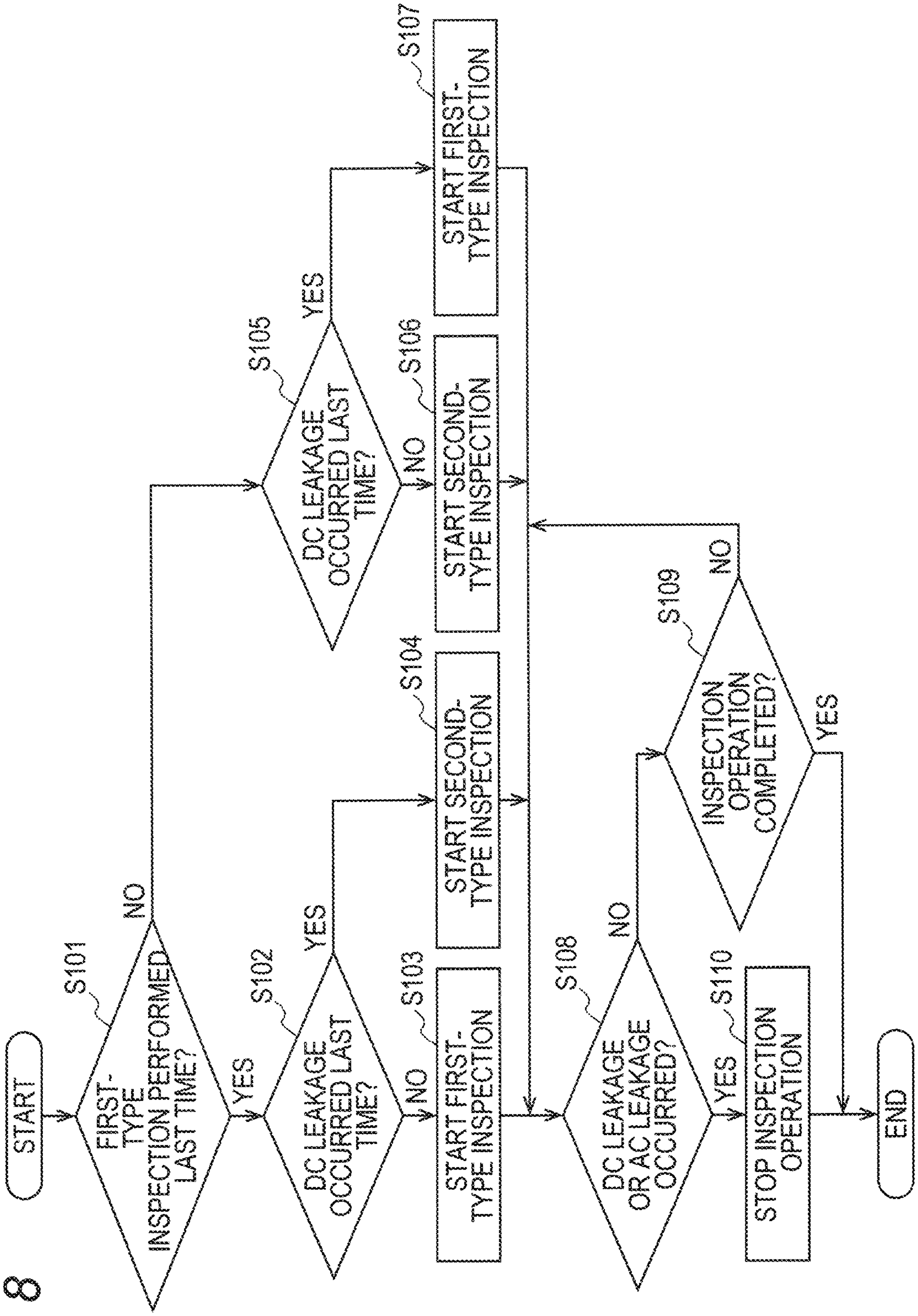
FIG. 8 is a flowchart showing a flow of processing when an inspection instruction signal is received.

In the present embodiment, when performing processing according to the flowchart of FIG. 8, the controller 30 performs either a first-type inspection or a second-type inspection as the inspection operation. In the inspection operation, the controller 30 causes the inkjet head 4 to perform ejection driving for ejecting ink from the plurality of nozzle 10 of the inkjet head 4 while causing the voltage supply circuit 51 to apply a particular voltage to the electrode 26, acquires an inspection signal output from the amplifier circuit 53 when the ejection driving is performed, and inspects whether there is an abnormality in the ejection of liquid from the nozzle 10 based on the acquired inspection signal. The difference between the first-type inspection and the second-type inspection will be described in detail later.

To explain the flowchart of FIG. 8 in detail, the controller 30 first determines whether the first-type inspection was performed during the previous inspection operation (that is, the inspection operation performed last time) (S101). In a case where the first-type inspection was performed during the previous inspection operation (S101: YES), the controller 30 determines whether the DC leakage occurred during the previous inspection operation (S102). In a case where the DC leakage did not occur during the previous inspection operation (S102: NO), the controller 30 starts the first-type inspection (S103). In a case where the DC leakage occurred during the previous inspection operation (S102: YES), the controller 30 starts the second-type inspection (S104).

In a case where the second-type inspection was performed during the previous inspection operation (S101: NO), the controller 30 determines whether the DC leakage occurred during the previous inspection operation (S105). In a case where the DC leakage did not occur during the previous inspection operation (S105: NO), the controller 30 starts the second-type inspection (S106). In a case where the DC leakage occurred during the previous inspection operation (S105: YES), the controller 30 starts the first-type inspection (S107).

After the start of any of the inspections in S103 to S107, in a case where neither the DC leakage nor the AC leakage occurs (S108: NO) and the inspection operation is completed (S109: YES), the processing ends. In a case where either the DC leakage or the AC leakage occurs (S108: YES) after the start of any of the inspections in S103 to S107 and before the inspection operation is completed (S109: NO), the controller 30 stops the inspection operation (S110) and the processing ends. Stopping the inspection operation means causing the voltage supply circuit 51 to stop applying a particular voltage to the electrode 26 and stopping the subsequent ejection driving and thereafter at the current inspection timing.

Next, the first-type inspection and the second-type inspection will be described. In the first-type inspection and the second-type inspection, the controller 30 causes the inkjet head 4 to perform ejection driving for ejecting ink from the nozzle 10 for each of the plurality of nozzles 10 of the inkjet head 4 while causing the voltage supply circuit 51 to apply a particular voltage to the electrode 26, acquires an inspection signal output from the amplifier circuit 53 when the ejection driving is performed, and inspects whether there is an abnormality in the ejection of liquid from the nozzle 10 based on the acquired inspection signal. In the first-type inspection, the inspection signal is acquired for each of the plurality of nozzles in a first order. In the second-type inspection, the inspection signal is acquired for each of the plurality of nozzles in a second order different from the first order.

Figures 9A, 9B, 9C:
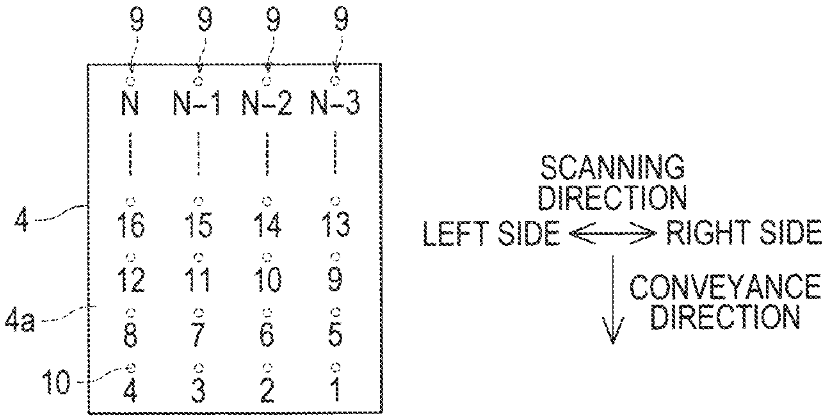
FIG. 9A is a diagram for explaining nozzle numbers.
FIG. 9B is a diagram for explaining a first order.
FIG. 9C is a diagram for explaining a second order.

The first order and the second order will be described. To describe the first order and the second order, as shown in FIG. 9A, the inkjet head 4 has N nozzles 10, and these N nozzles 10 are assigned individual nozzle numbers "1" to "N". Specifically, the plurality of nozzles 10 constituting the rightmost nozzle array 9 in the scanning direction are assigned nozzle numbers "1", "5", "9", . . . , and "N-3" in order from the nozzle located downstream in the conveyance direction. The plurality of nozzles 10 constituting the second nozzle array 9 from the right side in the scanning direction are assigned nozzle numbers "2", "6", "10", . . . , and "N-2" in order from the nozzle located downstream in the conveyance direction. The plurality of nozzles 10 constituting the third nozzle array 9 from the right side in the scanning direction are assigned nozzle numbers "3", "7", "11", . . . , and "N-1" in order from the nozzle located downstream in the conveyance direction. The plurality of nozzles 10 constituting the leftmost nozzle array 9 in the scanning direction are assigned nozzle numbers "4", "8", "12", . . . , and "N" in order from the nozzle located downstream in the conveyance direction.

As shown in FIG. 9B, the first order is the order of nozzle numbers. That is, the first order is an order in which an inspection signal is acquired for the nozzle 10 with the nozzle number "1" first, and then inspection signals are acquired for the nozzles 10 with the nozzle numbers "2", "3", . . . , "N-1", and "N" in order.

In the present embodiment, as shown in FIG. 9C, information about the number of times of occurrences of DC leakages is stored in the memory 34 for each nozzle 10 of the inkjet head 4. Among the nozzles 10 for which the number of times of occurrences of DC leakages is less than or equal to a first number, the nozzle number of the nozzle 10 with the smallest nozzle number is defined as "Aa". The second order is an order in which the inspection signals are acquired for the nozzles 10 with the nozzle numbers "Aa" to "N" in the order of the nozzle numbers, and then, the inspection signals are acquired for the nozzles 10 with the nozzle numbers "1" to "Aa-1" in the order of the nozzle numbers. FIG. 9C shows a case in which the first number is 2 and Aa is 6. In this example, the second order is an order in which the inspection signals are acquired for the nozzles 10 with the nozzle numbers "6" to "N" in the order of the nozzle numbers, and then, the inspection signals are acquired for the nozzles 10 with the nozzle numbers "1" to "5" in the order of the nozzle numbers.

In the present embodiment, in the inspection operation, the first-type inspection in which the inspection signal is acquired for each of the plurality of nozzles 10 in the first order and the second-type inspection in which the inspection signal is acquired for each of the plurality of nozzles 10 in the second order are performed. In the present embodiment, if a leakage occurs during the first-type inspection, the first-type inspection is stopped, and thus the inspection signal for the nozzle 10 for which the inspection signal was to be acquired thereafter is not acquired. Since there is a high possibility that a leakage will occur in the same nozzle 10 in the next inspection operation, if the first-type inspection is again performed in the next inspection operation, a nonuniformity will occur regarding the nozzles 10 for which the inspection signal is not acquired (that is, the inspection signal is acquired for certain nozzles but is not acquired for the other nozzles). Here, the "leakage" includes the DC leakage or the AC leakage, or includes both the DC leakage and the AC leakage.

Thus, in the present embodiment, in a case where the DC leakage occurs during the first-type inspection, the second-type inspection is performed in the next inspection operation, and the order of the nozzles 10 for which the inspection signal is acquired is changed. Thus, even in a case where the DC leakage occurs at the same nozzle 10, the nonuniformity of the nozzles 10 for which the inspection signal is not acquired is suppressed, and the number of nozzles 10 for which the inspection signal is not acquired is reduced.

If inspection signals are always acquired for the plurality of nozzles 10 in the same order in the inspection operation, there is a high possibility that the DC leakage occurs at a specific nozzle 10 in a concentrated manner, and damage to that nozzle 10 will become greater.

In the present embodiment, as described above, in a case where the DC leakage occurs during the first-type inspection, the second-type inspection is performed in the next inspection operation to change the order of the nozzles 10 for which the inspection signal is acquired. Thus, it is unlikely that the DC leakage occurs at specific nozzles 10 in a concentrated manner.

The DC leakage is more likely to occur due to factors in the environment around the inkjet head 4. Thus, in a case where the DC leakage occurs at a nozzle in the first-type inspection, when the order of the nozzles for which the inspection signal is acquired is changed in the next inspection operation, it becomes more likely that a leakage will occur in the next inspection operation at nozzles which are close to the nozzle 10 and for which the inspection signal is acquired before the nozzle 10. Thus, in the present embodiment, as described above, in a case where the DC leakage occurs during the first-type inspection, the second-type inspection is performed in the next inspection operation to change the order of the nozzles 10 for which the inspection signal is acquired. Thus, it is unlikely that the DC leakage occurs at specific nozzles 10 in a concentrated manner.

The AC leakage is more likely to occur due to factors in the nozzle 10 itself than the DC leakage. Thus, when the AC leakage occurs, even if the order of the nozzles 10 for which the inspection signal is acquired in the next inspection operation is changed, there is a high possibility that the AC leakage will occur in the same nozzle 10. In other words, even if the order of the nozzles 10 for which the inspection signal is acquired in the next inspection operation is changed, there is a low possibility of acquiring the effect of suppressing an occurrence of the leakage at specific nozzles 10 in a concentrated manner.

Thus, in the present embodiment, even if the AC leakage occurs during the first-type inspection, if no DC leakage occurs, the first-type inspection is again performed in the next inspection operation, and the order of the nozzles 10 for which the inspection signal is acquired is not changed. In this way, the process is simplified.

In the present embodiment, in the second-type inspection, the inspection signal is acquired in the second order for the plurality of nozzles 10. In the second order, the inspection signal is acquired first for a nozzle that is different from the nozzle 10 for which the inspection signal was acquired first in the first-type inspection, and the number of times of occurrences of leakages at this nozzle is less than or equal to the first number. This increases a possibility of increasing the number of nozzles 10 for which the inspection signal is acquired before a leakage occurs in the second-type inspection.

While the disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the disclosure, and not limiting the disclosure. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described disclosure are provided as described below.

For example, the order in which the inspection signal for each of the plurality of nozzles 10 is acquired in the inspection operation is not limited to that described in the above-described embodiment.

For example, in the above-described embodiment, the second order may be an order in which the inspection signal is acquired first for a nozzle other than the nozzle 10 having the smallest nozzle number, among the nozzles 10 for which the number of times of occurrences of DC leakages is less than or equal to the first number. In the second order, after the inspection signal is acquired first for any nozzle 10 for which the number of times of occurrences of DC leakages is less than or equal to the first number, and then the inspection signals are acquired for the remaining nozzles 10. This order may be different from the order described in the above-described embodiment.

In a first modification, as shown in FIG. 10, the second order is an order in which the inspection signals are acquired in order from the nozzle 10 for which the number of times of occurrences of DC leakages is the smallest. Specifically, the inspection signal is acquired first for the nozzles 10 for which the number of times of occurrences of DC leakages is zero, then for the nozzles 10 for which the number of times of occurrences of DC leakages is 1, and sequentially for the nozzles 10 for which the number of times of occurrences of DC leakages is 2, 3, and so on. In the example of FIG. 10, the inspection signals are acquired for the plurality of nozzles 10 for which the numbers of times of occurrences of DC leakages are the same in order from the nozzle 10 with the smallest nozzle number, but the inspection signals for these nozzles 10 may be acquired in a different order. Here, BH (H=0, 1, 2, 3, 4, 5) in FIG. 10 is the number of nozzles 10 for which the number of times of occurrences of DC leakages is H or less.

In the first modification, in the second-type inspection, the inspection signal is acquired for each of the plurality of nozzles 10 in the second order in which the inspection signal is acquired in order from the nozzle 10 for which the number of times of occurrences of leakages is the smallest. This increases a possibility of increasing the number of nozzles 10 for which the inspection signal is acquired before a leakage occurs in the second-type inspection.

In a second modification, as shown in FIG. 11, it is assumed that the nozzle number of the nozzle 10 at which the DC leakage occurred in the previous first-type inspection is "Ab". In the second modification, the second order is an order in which inspection signals are acquired for the nozzles 10 with the nozzle numbers "Ab+1" to "N" in the order of the nozzle numbers, and then inspection signals are acquired for the nozzles 10 with the nozzle numbers "1" to "Ab" in the order of the nozzle numbers. In FIG. 11, "Yes" indicates the nozzle 10 at which the DC leakage occurred in the previous first-type inspection, and shows the case where "Ab" is "8".

Regarding the nozzle 10 at which a leakage occurred, there is a high possibility that the DC leakage occurs again in the next inspection operation. In the second modification, in the second-type inspection, the inspection signal is acquired in the second order in which the inspection signal is acquired first for the nozzle 10 other than the nozzle 10 at which the DC leakage occurred in the first-type inspection. This increases a possibility of increasing the number of nozzles 10 for which the inspection signals are acquired before the leakage occurs in the second-type inspection.

In the second modification, the nozzle number of the nozzle 10 at which the DC leakage occurred in the previous first-type inspection is set to "Ab", and the inspection signal is acquired first for the nozzle 10 with the nozzle number "Ab+1". However, the inspection signal may be acquired first for the nozzle 10 with a nozzle number other than "Ab" and "Ab+1". The order of the nozzles 10 for which the second and subsequent inspection signals are acquired may be different from the order described in the second modification.

In a third modification, as shown in FIG. 12, it is assumed that the nozzle number of the nozzle 10 at which the DC leakage occurred during the previous first-type inspection is "Ac". In the third modification, the second order is an order in which inspection signals are acquired for the nozzles 10 with the nozzle numbers "Ac+5" to "N" in the order of the nozzle numbers, and then inspection signals are acquired for the nozzles 10 with the nozzle numbers "1" to "Ac+4" in the order of the nozzle numbers. That is, in the second order in the third modification, the inspection signal is acquired first for the nozzle 10 for which an inspection signal was to be acquired a particular number after the nozzle 10 at which the DC leakage occurred during the first-type inspection, where the particular number is 5. In FIG. 12, "Yes" indicates the nozzle 10 at which the DC leakage occurred during the previous first-type inspection, and shows the case where "Ac" is "4".

In a case where a DC leakage occurs, there is a high possibility that a leakage occurs in the next inspection operation at the nozzle 10 at which the DC leakage occurred and the nozzles 10 in the vicinity thereof. In the third modification, in the second-type inspection, the inspection signal for each of the plurality of nozzles 10 is acquired in a second order such that the inspection signal is acquired first for the nozzle 10 which is a particular number (two or more) after the nozzle 10 at which the DC leakage occurred in the first-type inspection in the first order. This increases a possibility that the inspection signal for the nozzles 10 that are far from the nozzles 10 at which a leakage occurred in the first-type inspection is acquired first in the second-type inspection, and that the number of nozzles 10 for which inspection signals are acquired before a leakage occurs increases.

In the third modification, the particular number is set to 5, but the particular number may be set to 2, 3, 4, or an integer of 6 or more. The order of the nozzles 10 for which the second and subsequent inspection signals are acquired may be an order different from the order of the nozzle numbers.

In a fourth modification, as shown in FIG. 13, total number of times DK, DY, DC, and DM, which are the total numbers of times of leakages occurred during the inspection operation in the plurality of nozzles 10 constituting the nozzle array 9, are stored in the memory 34 for each nozzle array 9, that is, for each color of ink ejected. The total number of times DK, DY, DC, and DM may be sums of the total numbers of times of occurrences of DC leakages and the total numbers of times of occurrences of AC leakages, or may be the total numbers of times of occurrences of DC leakages, or may be the total numbers of times of occurrences of AC leakages.

The second order in the fourth modification is an order in which the inspection signal is acquired first for the plurality of nozzles 10 constituting the nozzle array 9 corresponding to a small total number among the total number of times DK, DY, DC, and DM.

Among any two nozzle arrays 9 of the four nozzle arrays 9, the plurality of nozzles 10 constituting one nozzle array 9 corresponds to "plurality of first nozzles", and the plurality of nozzles 10 constituting the other nozzle array 9 corresponds to "plurality of second nozzles". In a case where a first total number of times of occurrences of leakage in the plurality of first nozzles is less than a second total number of times of occurrences of leakages in the plurality of second nozzles, the second order is an order in which an inspection signal for each of the plurality of first nozzles is acquired, and then an inspection signal for each of the plurality of second nozzles is acquired. In a case where the second total number of times of occurrences is less than the first total number of times of occurrences, the second order is an order in which an inspection signal for each of the plurality of second nozzles is acquired, and then an inspection signal for each of the plurality of first nozzles is acquired.

In the second order, the order of acquiring the inspection signals for the plurality of nozzles 10 constituting each nozzle array 9 is any order. For example, the inspection signals may be acquired for the plurality of nozzles 10 constituting each nozzle array 9 in order from the nozzle 10 downstream in the conveyance direction.

In a case where a DC leakage occurs, in the next inspection operation, a leakage is more likely to occur at nozzles 10 that eject ink of the same color as the nozzle 10 at which the DC leakage occurred than the nozzles 10 that eject ink of different colors. In the fourth modification, in the second-type inspection, the inspection signal for each of the plurality of nozzles 10 is acquired in a second order such that the inspection signals are acquired first for the nozzles 10 of the nozzle array 9 having the smaller total number of times of occurrences among any two nozzle arrays 9. This increases a possibility that the number of nozzles 10 for which the inspection signals are acquired before a leakage occurs in the second-type inspection increases.

In fifth, sixth, and seventh modifications, for each of a plurality of divided regions E into which the nozzle surface 4*a* is divided, the total number of times of occurrences of leakages during the inspection operation for the nozzles 10 located in the divided region E is stored in the memory 34. The total number of times of occurrences may be the sum of the total number of times of occurrences of DC leakages and the total number of times of occurrences of AC leakages, or may be the total number of times of occurrences of DC leakages, or may be the total number of times of occurrences of AC leakages.

Figure 14C:
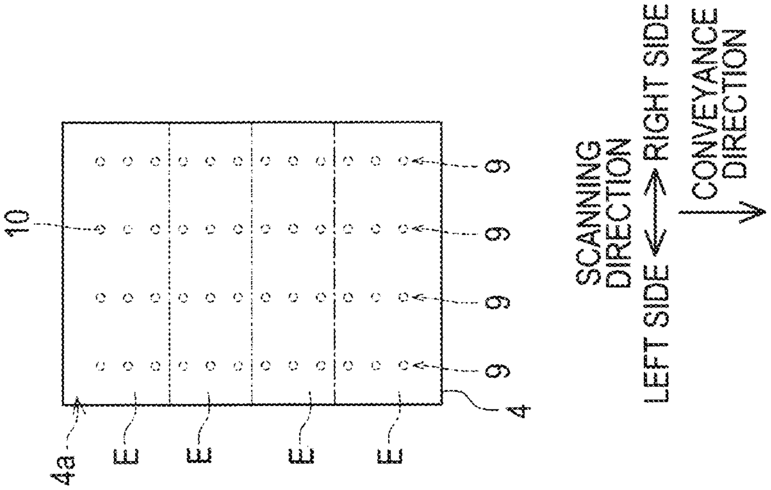
FIG. 14C is a diagram for explaining still another example of divided regions.
Figure 14B:
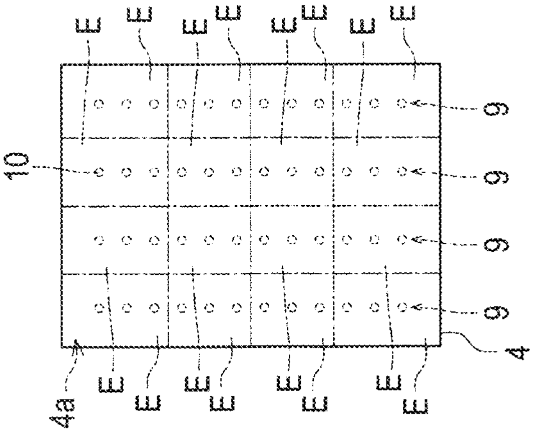
FIG. 14B is a diagram for explaining another example of divided regions.
Figure 14A:
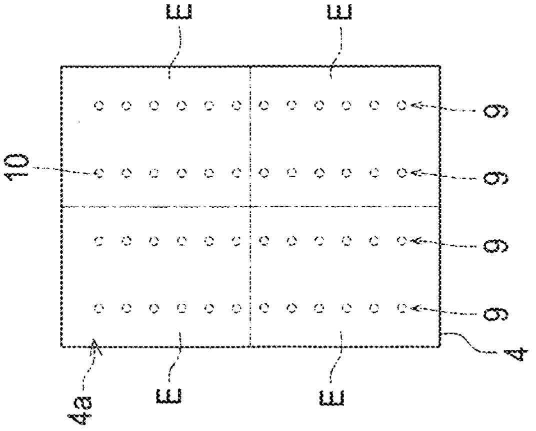
FIG. 14A is a diagram for explaining an example of divided regions.

In the fifth modification, as shown in FIG. 14A, the nozzle surface 4*a* is divided into a total of four divided regions E, two of which are arranged in each of the scanning direction and the conveyance direction. In the sixth modification, as shown in FIG. 14B, the nozzle surface 4*a* is divided into a total of sixteen divided regions E, four of which are arranged in each of the scanning direction and the conveyance direction. In the seventh modification, as shown in FIG. 14C, the nozzle surface 4*a* is divided into four divided regions E arranged in the conveyance direction. The manner in which the nozzle surface 4*a* is divided into the plurality of divided regions E may be different from that shown in FIGS. 14A to 14C. In the examples of FIGS. 14A to 14C, the number of nozzles 10 located in the divided region E is the same among the divided regions E, but the number of nozzles 10 located in the divided region E may be different among the divided regions E.

The second order in the fifth to seventh modifications is an order in which the inspection signal is acquired for each nozzle 10 located in the divided region E in order from the divided region E for which the total number of times of occurrences is the smallest among the plurality of divided regions E. Thus, the second order in the fifth to seventh modifications is an order in which the inspection signal is acquired first for each nozzle 10 located in the divided region E for which the total number of times of occurrences is the smallest among the plurality of divided regions E.

In a case where a DC leakage occurs, a DC leakage is more likely to occur in the next inspection operation in nozzles 10 located in the same divided region E as the nozzle 10 at which the DC leakage occurred than the nozzles 10 located in another divided region E. In the fifth to seventh modifications, the inspection signal is acquired for each of the plurality of nozzles in the second-type inspection in an order such that the inspection signal is acquired first for the nozzles located in the divided region E for which the total number of times of occurrences of leakages is the smallest among the plurality of divided regions E. This increases a possibility that the number of nozzles for which the inspection signal is acquired before a leakage occurs in the second-type inspection increases.

In the fifth to seventh modifications, the second order is an order in which the inspection signal is acquired for each nozzle 10 located in the divided region E in order from the divided region E for which the total number of times of occurrences is the smallest among the plurality of divided regions E, but the present disclosure is not limited to this. The second order may be an order in which the inspection signals are acquired first for the nozzles 10 located in the divided region E for which the total number of times of occurrences is the smallest among the plurality of divided regions E, and the order of the nozzles 10 for which the subsequent inspection signals are acquired is different from the order of the fifth to seventh modifications.

In an eighth modification, the second order is an order in which the inspection signal is acquired first for the nozzles 10 that are far from the nozzle 10 at which the DC leakage occurred in the previous first-type inspection. For example, as shown in FIG. 15, in a case where the DC leakage occurs at the nozzle 10 with the nozzle number “2” during the previous first-type inspection, the second order is such that the inspection signals are acquired for the nozzles 10 with the nozzle numbers “N”, “N-1”, . . . , “4”, and “3” in this order, then the inspection signal is acquired for the nozzle 10 with the nozzle number “1”, and the inspection signal is acquired finally for the nozzle 10 with the nozzle number “2”.

Among the plurality of nozzles 10 of the inkjet head 4, any two nozzles 10 are defined as a first nozzle and a second nozzle, and any nozzle 10 that is farther from the first nozzle than the second nozzle is defined as a third nozzle. In this case, the second order in the eighth modification is an order in which, in a case where the nozzle 10 at which the DC leakage occurred in the previous first-type inspection is the first nozzle, the inspection signal for the third nozzle is acquired before acquiring the inspection signal for the second nozzle.

In a case where a leakage occurs at a certain nozzle 10 during the inspection operation, the closer the nozzle is to the certain nozzle 10, the more likely it is that a leakage will occur in the next inspection operation. Thus, in the eighth modification, when the DC leakage occurs at the first nozzle in the first-type inspection, the inspection signal for each of the plurality of nozzles 10 is acquired in a second order such that the inspection signal for the third nozzle, which is farther from the first nozzle than the second nozzle is, is acquired in the next second-type inspection before the inspection signal for the second nozzle is acquired. This increases a possibility that the number of nozzles 10 for which the inspection signal is acquired before a leakage occurs in the second-type inspection increases.

Figure 16:
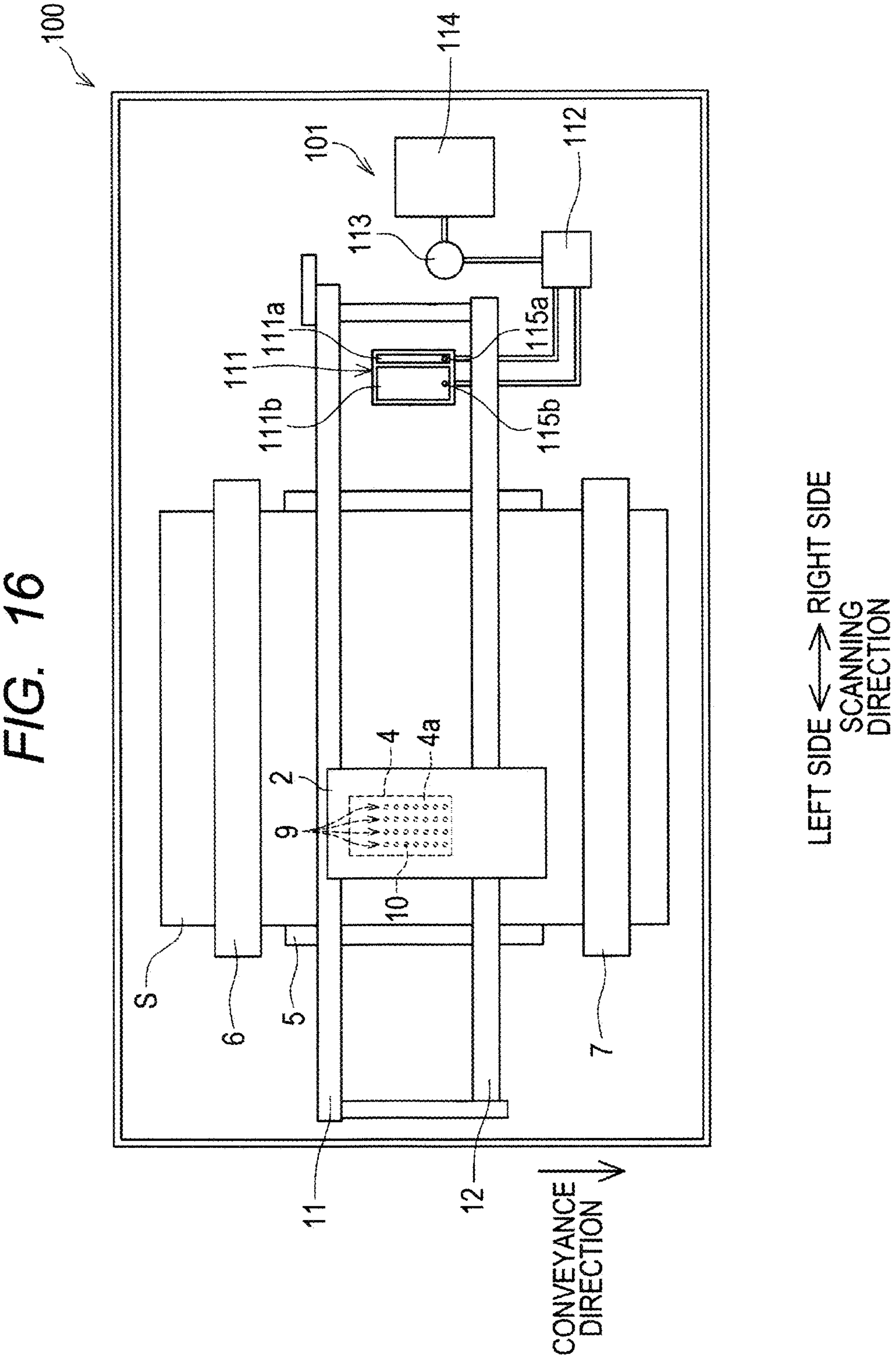
FIG. 16 is a schematic configuration diagram of a printer in which a cap is provided individually for nozzles for ejecting black ink and nozzles for ejecting color ink.

As shown in FIG. 16, a printer 100 according to a ninth modification is a printer in which the maintenance unit 8 of the printer 1 of the above-described embodiment is replaced with a maintenance unit 101. The maintenance unit 101 includes a cap 111, a switching unit 112, a suction pump 113, and a waste liquid tank 114.

The cap 111 is a combination of a first cap 111*a* and a second cap 111*b*. The first cap 111*a* and the second cap 111*b* are aligned in the scanning direction. When the carriage 2 is located at the maintenance position, the plurality of nozzles 10 that constitutes the rightmost nozzle array 9 and ejects black ink faces the first cap 111*a*, and the plurality of nozzles 10 that constitutes the three left-side nozzle arrays 9 and ejects color ink faces the second cap 111*b*. The color ink is yellow, cyan, and magenta ink.

When the cap 111 is raised by the cap lifting mechanism 38 in this state, a capped state is established in which the plurality of nozzles 10 that constitutes the rightmost nozzle array 9 is covered by the first cap 111*a*, and the plurality of nozzles 10 that constitutes the three left-side nozzle arrays 9 is covered by the second cap 111*b*. When the cap 111 is lowered by the cap lifting mechanism 38, an uncapped state is established in which the plurality of nozzles 10 are not covered by the cap 21. The first cap 111*a* and the second cap 111*b* are provided with discharge ports 115*a* and 115*b*, respectively.

Each of the discharge ports 115*a* and 115*b* is connected to the suction pump 113 via the switching unit 112. The switching unit 112 selectively connects either the discharge port 115*a* or 115*b* to the suction pump 113. The suction pump 113 is connected to the waste liquid tank 114. The suction pump 113 is similar to the suction pump 22 in the above-described embodiment, and the waste liquid tank 114 is similar to the waste liquid tank 23 in the above-described embodiment.

In the ninth modification, when the capped state is established and the suction pump 113 is driven in a state where the discharge port 115*a* is connected to the suction pump 113 by the switching unit 112, a black purge is performed to discharge black ink in the inkjet head 4 from the plurality of nozzles 10 constituting the rightmost nozzle array 9. When the capped state is established and the suction pump 113 is driven in a state where the discharge port 115*b* is connected to the suction pump 113 by the switching unit 112, a color purge is performed to discharge color ink in the inkjet head 4 from the plurality of nozzles 10 constituting the three left-side nozzle arrays 9.

Although not shown, in the ninth modification, the electrode 26 is disposed on each of the first cap 111*a* and the second cap 111*b*. The connection relationship between the electrodes 26 and other components of the inspection circuit 27 is the same as the connection relationship between the electrode 26 and other components of the inspection circuit 27 in the above-described embodiment.

In the ninth modification, the controller 30 also performs the processing according to the flowchart of FIG. 8 when the controller 30 receives an inspection instruction signal. In the ninth modification, the second order is different from that of the above-described embodiment.

Figures 17A, 17B, 18:
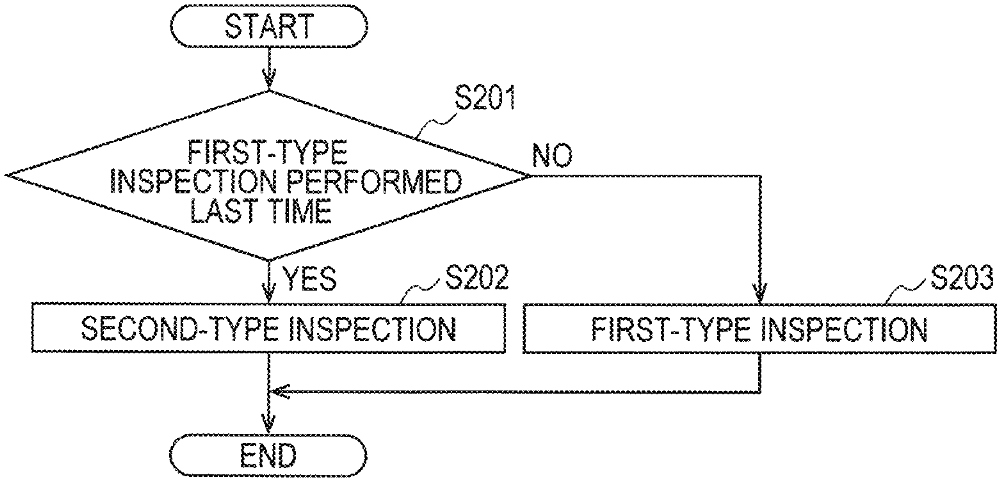
FIG. 17A is a diagram for explaining an example of a second order when a leakage occurs at a nozzle that ejects black ink in the previous inspection operation in the printer of FIG. 16.
FIG. 17B is a diagram for explaining an example of a second order when a leakage occurs at a nozzle that ejects color ink in the previous inspection operation in the printer of FIG. 16.
FIG. 18 is a flowchart showing a flow of processing when an inspection instruction signal is received in an example in which a first-type inspection and a second-type inspection are alternately performed regardless of occurrence of leakage.

To explain in detail, in the ninth modification, as shown in FIGS. 17A and 17B, when the DC leakage occurs during the inspection operation, information indicating the nozzle 10 at which the DC leakage occurred is stored in the memory 34.

As shown in FIG. 17A, in a case where the DC leakage occurs at any of the nozzles 10 constituting the rightmost nozzle array 9, that is, the nozzles 10 ejecting black ink, during the previous first-type inspection, the second order is an order in which an inspection signal is acquired for each of the plurality of nozzles 10 constituting the three left-side nozzle arrays 9 and ejecting color ink, and then an inspection signal is acquired for each of the plurality of nozzles 10 constituting the rightmost nozzle array 9 and ejecting black ink.

As shown in FIG. 17B, in a case where the DC leakage occurs at any of the nozzles 10 constituting the three left-side nozzle arrays 9, that is, the nozzles 10 ejecting color ink, during the previous first-type inspection, the second order is an order in which an inspection signal is acquired for each of the plurality of nozzles 10 constituting the rightmost nozzle array 9 and ejecting black ink, and then an inspection signal is acquired for each of the plurality of nozzles 10 constituting the three left-side nozzle arrays 9 and ejecting color ink.

In the ninth modification, as shown in FIGS. 17A and 17B, the second order is such that when acquiring the inspection signal for each of the plurality of nozzles 10 ejecting black ink, and when acquiring the inspection signal for each of the nozzles 10 ejecting color ink, the inspection signals are acquired in ascending order of the nozzle numbers. However, in the second order, the order in which the inspection signal is acquired for each of the plurality of nozzles 10 ejecting black ink may be a different order. In the second order, the order in which the inspection signal is acquired for each of the plurality of nozzles 10 ejecting color ink may be a different order.

In a case where a leakage occurs at the nozzle 10 ejecting black ink, the leakage may be caused by ink attached to the first cap 111*a*. In the ninth modification, in the first-type inspection, an inspection signal is acquired for each of the plurality of nozzles 10 covered by the first cap 111*a*, and then an inspection signal is acquired for each of the plurality of nozzles 10 covered by the second cap 111*b*. In a case where a leakage occurs at the nozzle 10 covered by the first cap 111*a* in the first-type inspection, in the next second-type inspection, the inspection signal for each of the plurality of nozzles is acquired in the second order such that an inspection signal is acquired for each of the plurality of nozzles 10 covered by the second cap 111*b*, and then an inspection signal is acquired for each of the first nozzles covered by the first cap 111*a*. This increases a possibility that the number of nozzles for which an inspection signal is acquired before a leakage occurs in the second-type inspection increases.

In a tenth modification, the controller 30 performs the processing according to the flowchart of FIG. 18 when the controller 30 receives an inspection instruction signal. To explain in detail, the controller 30 first determines whether the first-type inspection was performed in the previous inspection operation (S201). In a case where the first-type inspection was performed in the previous inspection operation (S201: YES), the controller 30 starts the second-type inspection (S202). In a case where the second-type inspection was performed in the previous inspection operation (S201: NO), the controller 30 starts the first-type inspection (S203).

In a case where the inspection operation is stopped due to the occurrence of a leakage during the inspection operation, the inspection signals for the nozzles 10 for which the inspection signal was to be acquired after this are not acquired. In the tenth modification, when the inspection operation is performed after the first-type inspection, the second-type inspection is performed in the next inspection operation regardless of whether a leakage occurred during the first-type inspection. Thus reduces the nonuniformity of the nozzles for which the inspection signal is not acquired (that is, the inspection signal is acquired for certain nozzles but is not acquired for the other nozzles), and reduces the number of nozzles for which the inspection signal is not acquired. This simplifies the process compared to a case where the first-type inspection or the second-type inspection is performed as the inspection operation following the first-type inspection, depending on whether a leakage occurred during the first-type inspection.

Figure 19A:
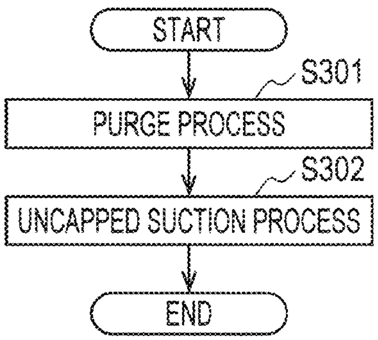
FIG. 19A is a flowchart showing a flow of processing when a purge instruction signal is received.

In an eleventh modification, in response to receiving a purge instruction signal instructing to perform a purge, the controller 30 performs the processing according to the flowchart in FIG. 19A. To explain the flowchart in FIG. 19A in detail, when the controller 30 receives a purge instruction signal, the controller 30 first performs a purge process (S301). In the purge process, the controller 30 controls the carriage motor 36, the cap lifting mechanism 38, the suction pump 22, and so on to perform the above-described suction purge. Next, the controller 30 performs a suction process in an uncapped state (uncapped suction process) (S302). In the suction process in the uncapped state, the controller 30 controls the carriage motor 36, the cap lifting mechanism 38, the suction pump 22, and so on to perform the above-described suction in the uncapped state.

Figure 19B:
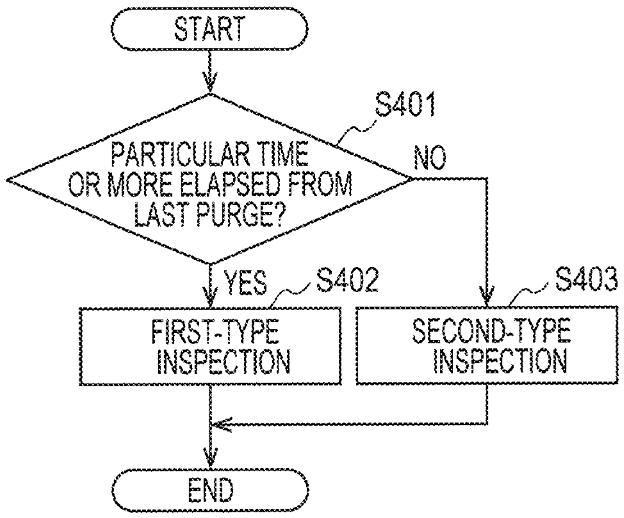
FIG. 19B is a flowchart showing a flow of processing when an inspection instruction signal is received in an example of determining which of the nozzles close to a lip and the nozzles far from the lip the inspection signal is to be acquired first in accordance with an elapsed time from purge.

In the eleventh modification, in response to receiving an inspection instruction signal, the controller 30 performs the processing according to the flowchart in FIG. 19B. To explain in detail, the controller 30 first determines whether a particular time or more has elapsed since the last suction purge was performed (S401). In a case where the particular time or more has elapsed since the last suction purge was performed (S401: YES), the controller 30 performs the first-type inspection (S402). In a case where the particular time or more has not elapsed since the last suction purge was performed (S401: NO), the controller 30 performs the second-type inspection (S403).

Figure 19C:
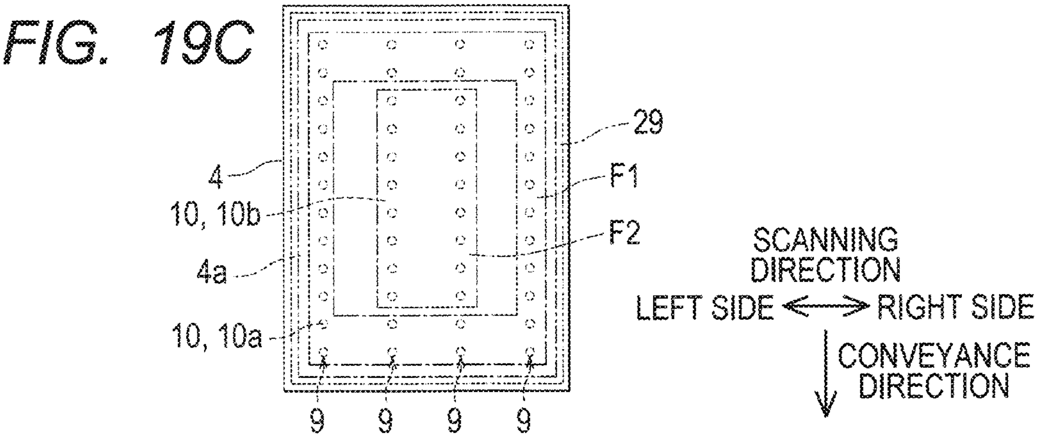
FIG. 19C is a diagram for explaining the first nozzles and the second nozzles in the example of determining which of the nozzles close to the lip and the nozzles far from the lip the inspection signal is to be acquired first in accordance with the elapsed time from purge.

In the first-type inspection, the controller 30 acquires the inspection signal for each of the plurality of nozzles 10 of the inkjet head 4 in a first order such that the controller 30 acquires the inspection signal for each of a plurality of nozzles 10*a* located in a region F1 on the outer edge side of the nozzle surface 4*a* shown in FIG. 19C, and then acquires the inspection signal for each of a plurality of nozzles 10*b* located in a region F2 of the nozzle surface 4*a* that is farther from the lip 29 than the region F1 in the capped state. In the eleventh modification, the nozzles 10*a* located in the region F1 are an example of "first nozzle" of the present disclosure, and the nozzles 10*b* located in the region F2 are an example of "second nozzle" of the present disclosure.

In the second-type inspection, the controller 30 acquires the inspection signal for each of the plurality of nozzles 10 of the inkjet head 4 in a second order such that the controller 30 acquires the inspection signal for each of the plurality of nozzles 10*b* located in the region F2, and then acquires the inspection signal for each of the plurality of nozzles 10*a* located in the region F1.

In the first-type and second-type inspections, the order of acquiring the inspection signal for each of the plurality of nozzles 10*a* located in the region F1 and the order of acquiring the inspection signal for each of the plurality of nozzles 10*b* located in the region F2 are any order. For example, the inspection signal may be acquired for each of the plurality of nozzles 10*a* located in the region F1 in the order of the nozzle numbers. For example, the inspection signal may be acquired for each of the plurality of nozzles 10*b* located in the region F2 in the order of the nozzle numbers.

After purge, ink may be attached to the lip 29, and a leakage is likely to occur at the nozzles 10 close to the lip 29 due to the ink attached to the lip 29. Thus, in the eleventh modification, when the inspection operation is performed in a state where the particular time or more has elapsed since the last purge, the first-type inspection is performed to acquire the inspection signal for each of the plurality of nozzles 10 in the first order such that the inspection signals for the plurality of nozzles 10_a_ are acquired, and then the inspection signals for the plurality of nozzles 10_b_ farther from the lip 29 than the plurality of nozzles 10_a_ are acquired. When the inspection operation is performed in a state where the particular time has not elapsed since the last purge, the second-type inspection is performed to acquire the inspection signal for each of the plurality of nozzles in the second order such that the inspection signals for the plurality of nozzles 10_b_ are acquired, and then the inspection signals for the plurality of nozzles 10_a_ closer to the lip 29 than the plurality of nozzles 10_b_ are acquired. This increases the number of nozzles 10 for which the inspection signals are acquired before a leakage occurs, and reduces the number of nozzles 10 for which the inspection signals are not acquired in the inspection operation.

In a twelfth modification, as in the eleventh modification, the controller 30 performs the processing according to the flowchart of FIG. 19A in response to receiving a purge instruction signal instructing to perform a purge. In the twelfth modification, as in the eleventh modification, the controller 30 performs the processing according to the flowchart of FIG. 19B in response to receiving an inspection instruction signal.

Figure 20:
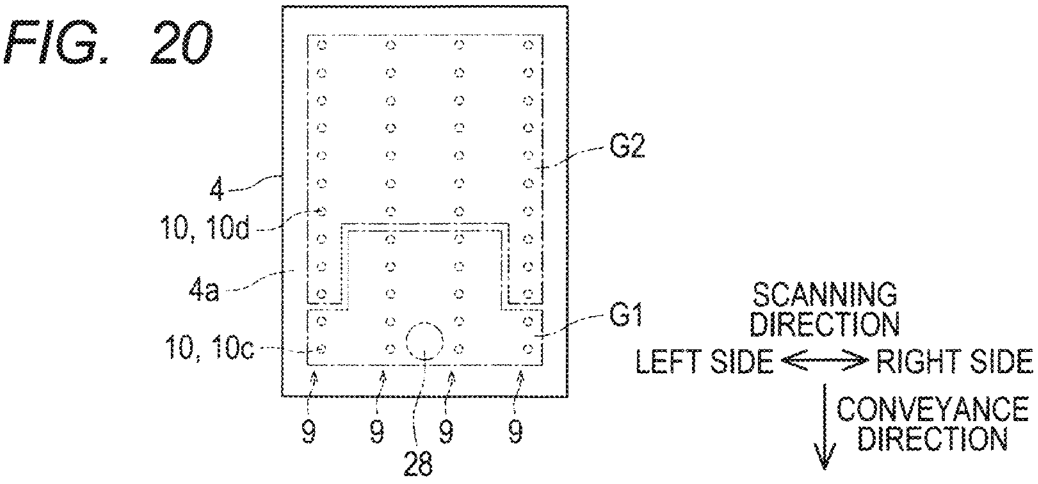
FIG. 20 is a diagram for explaining the first nozzles and the second nozzles in an example of determining which of the nozzles close to a discharge port and the nozzles far from the discharge port the inspection signal is to be acquired first, in accordance with the elapsed time from purge.

In the twelfth modification, the first order in the first-type inspection and the second order in the second-type inspection are different from those in the eleventh modification. To explain in detail, in the twelfth modification, in the first-type inspection, the controller 30 acquires the inspection signal for each of the plurality of nozzles 10 of the inkjet head 4 in a first order such that the controller 30 acquires the inspection signal for each of a plurality of nozzles 10_c_ located in a region G1 downstream in the conveyance direction of the nozzle surface 4_a_ shown in FIG. 20, and then acquires the inspection signal for each of a plurality of nozzles 10_d_ located in a region G2 of the nozzle surface 4_a_ that is farther from the discharge port 28 than the region G1 in the capped state. In the twelfth modification, the nozzles 10_c_ located in the region G1 are an example of "first nozzle" of the present disclosure and the nozzles 10_d_ located in the region G2 are an example of "second nozzle" of the present disclosure.

In the second-type inspection, the controller 30 acquires an inspection signal for each of the plurality of nozzles 10 of the inkjet head 4 in a second order such that the controller 30 acquires an inspection signal for each of the plurality of nozzles 10_d_ located in the region G2, and then acquires an inspection signal for each of the plurality of nozzles 10_c_ located in the region G1.

In the first-type and second-type inspections, the order in which the inspection signal is acquired for each of the plurality of nozzles 10_c_ located in region G1 and the order in which the inspection signal is acquired for each of the plurality of nozzles 10_d_ located in region G2 may be any order. For example, the inspection signal may be acquired for each of the plurality of nozzles 10_c_ located in region G1 in the order of the nozzle numbers. For example, the inspection signal may be acquired for each of the plurality of nozzles 10_d_ located in region G2 in the order of the nozzle numbers.

When the suction in the uncapped state is performed after the purge, ink may adhere to a portion near the discharge port 28 of the cap 21, and a leakage is likely to occur at the nozzles 10 close to the discharge port 28 due to the ink adhered to the portion near the discharge port 28 of the cap 21. Thus, in the twelfth modification, when the inspection operation is performed in a state where the particular time or more has elapsed since the last purge was performed, the first-type inspection is performed to acquire the inspection signal for each of the plurality of nozzles 10 in the first order such that the inspection signals for the plurality of nozzles 10_c_ are acquired, and then, the inspection signals for the plurality of nozzles 10_d_ that are farther from the discharge port 28 than the plurality of nozzles 10_c_ are acquired. When the inspection operation is performed in a state where the particular time has not elapsed since the last purge was performed, the second-type inspection is performed to acquire the inspection signal for each of the plurality of nozzles 10 in the second order such that the inspection signals for the plurality of nozzles 10_d_ are acquired, and then, the inspection signals for the plurality of nozzles 10_c_ that are closer to the discharge port 28 than the plurality of nozzles 10_d_ are acquired. This increases the number of nozzles 10 for which the inspection signal is acquired before a leakage occurs, and reduces the number of nozzles 10 for which the inspection signal is not acquired in the inspection operation.

In the eleventh and twelfth modifications, the embodiment is modified in that the inspection signal is acquired for either the plurality of first nozzles or the plurality of second nozzles depending on whether the time elapsed since the last purge is longer than or equal to a particular time. In the eleventh modification, the plurality of nozzles 10_a_ are the first nozzles, and the plurality of nozzles 10_b_ farther from the lip 29 than the plurality of nozzles 10_a_ are the second nozzles. In the twelfth modification, the plurality of nozzles 10_c_ are the first nozzles, and the plurality of nozzles 10_d_ farther from the discharge port 28 than the plurality of nozzles 10_c_ are the second nozzles. However, the first nozzles and the second nozzles may be different from these.

For example, if there is a difference in the amount of ink adhering to the nozzle surface 4_a_ after purge among regions of the nozzle surface 4_a_, the nozzle 10 located in a region of the nozzle surface 4_a_ where a large amount of ink is adhering to the nozzle surface 4_a_ after purge may be designated as the first nozzle, and the nozzle 10 located in a region of the nozzle surface 4_a_ where a small amount of ink is adhering to the nozzle surface 4_a_ after purge may be designated as the second nozzle.

In a thirteenth modification, the controller 30 perform X types of inspections, that is, first-type to X-th type inspections, where X is an integer of 2 or more and N or less. In a Z-th type inspection, where Z is a variable of 1 or more and X or less, an inspection signal is acquired in the Z-th order for each of the plurality of nozzles 10 of the inkjet head 4.

In a case where Z is 1, the first order is an order in which the inspection signal is acquired for each of the plurality of nozzles 10 of the inkjet head 4 in the order of the nozzle numbers, as in the first order in the above-described embodiment.

Figures 21A, 21B:
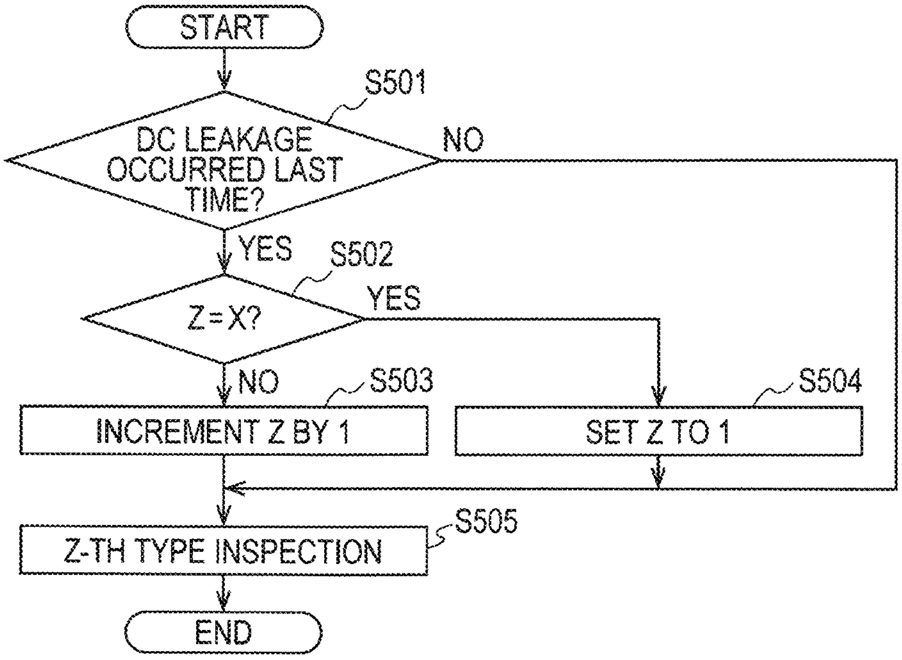
FIG. 21A is a diagram for explaining a Z-th order.
FIG. 21B is a flowchart showing a flow of processing when an inspection instruction signal is received in an example of determining in which order of the first to Z-th orders the inspection signal is to be acquired in accordance with a condition.

In a case where Z is 2 or more, as shown in FIG. 21A, the Z-th order is an order in which the inspection signal is acquired for each of the nozzles 10 whose nozzle numbers are $[(Z-1)\times Y+1]$ to N in the order of the nozzle numbers, and then, the inspection signal is acquired for each of the nozzles 10 whose nozzle numbers are 1 to $[(Z-1)\times Y]$ in the order of the nozzle numbers, where Y is an integer that is 1 or more and satisfies a relation $[(X-1)\times Y+1]\leq N$.

In a case where X=N, the Y that is 1 or more and satisfies the relation $[(X-1)\times Y+1]\leq N$ is 1 alone, and $[(X-1)\times Y+1]$ becomes N. In this case, the Nth order, which is the Z-th order when Z=N, is an order in which the inspection signal is acquired for the nozzle 10 with the nozzle number "N" as the nozzles 10 with the nozzle numbers [(Z−1)×Y+1] to N, and then, the inspection signal is acquired for each of the nozzles with the nozzle numbers "1" to "N-1" as the nozzles 10 with the nozzle numbers 1 to [(Z−1)×Y] in the order of the nozzle numbers.

As one example, it is assumed that the number of nozzles N=12, the number of types of inspections X=3, the above-mentioned integer Y=4. In the first order in the case of Z=1, the inspection signals are acquired in the order of the nozzle numbers 1 to 12. In the second order in the case of Z=2, the inspection signals are acquired in the order of the nozzle numbers 5, 6, 7, 8, 9, 10, 11, 12, 1, 2, 3, and 4. In the third order in the case of Z=3, the inspection signals are acquired in the order of the nozzle numbers 9, 10, 11, 12, 1, 2, 3, 4, 5, 6, 7, and 8.

In the thirteenth modification, in response to receiving an inspection instruction signal, the controller 30 performs the processing according to the flowchart in FIG. 21B. In the thirteenth modification, for example, the variable Z is set to 1 at the time of the initial startup of the printer 1.

To explain the flowchart in FIG. 21B in detail, the controller 30 first determines whether the DC leakage occurred during the previous inspection operation (S501). If no DC leakage occurred during the previous inspection operation (S501: NO), the controller 30 performs the Z-th type inspection without changing the variable Z (S505).

In a case where the DC leakage occurred during the previous inspection operation (S501: YES), the controller 30 subsequently determines whether the variable Z is equal to X (S502). In a case where the variable Z is not equal to X (S502: NO), the controller 30 increments the value of the variable Z by 1 (S503) and performs the Z-th type inspection (S505). In a case where the variable Z is equal to X (S502: YES), the controller 30 sets the value of the variable Z to 1 (S504) and performs the Z-th type inspection (S505). That is, the controller 30 performs the first-type inspection.

In a fourteenth modification, X types of inspections, that is, the first-type to the X-th type inspections, are performed as in the thirteenth modification. In the thirteenth modification, when the controller 30 receives an inspection instruction signal, the controller 30 performs the processing according to the flowchart in FIG. 22B. In the fourteenth modification, for example, the variable Z is set to 1 at the time of the initial startup of the printer 1.

Figure 22:
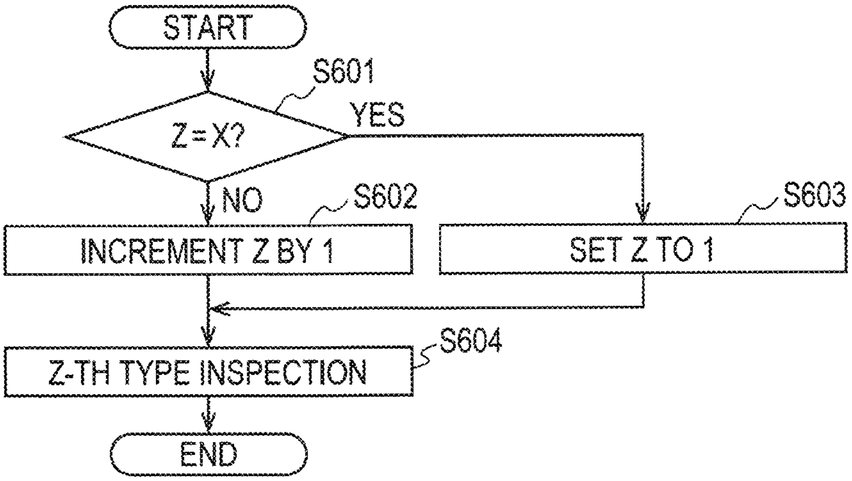
FIG. 22 is a flowchart showing a flow of processing when an inspection instruction signal is received in another example of determining in which order of the first to Z-th orders the inspection signal is to be acquired in accordance with a condition.

To explain the flowchart in FIG. 22 in detail, the controller 30 determines whether the variable Z is equal to X (S601). In a case where the variable Z is not equal to X (S601: NO), the controller 30 increments the value of the variable Z by 1 (S602) and performs the Z-th type inspection (S604). In a case where the variable Z is equal to X (S601: YES), the controller 30 sets the value of the variable Z to 1 (S603) and performs the Z-th type inspection (S604). That is, the controller 30 performs the first-type inspection.

In the thirteenth and fourteenth modifications, the order of the nozzles for which the inspection signal is acquired is shifted by Y among the first-type to the X-th type inspections (specifically, between the first-type inspection and the second-type inspection, between the second-type inspection and the third-type inspection, and so on). In this way, in a case where the inspection operation is performed in one of the first-type to the X-th type inspections according to the conditions, the order is changed to acquire the inspection signal for each of the plurality of nozzles 10. Thus, when the inspection operation is repeated, the inspection signal is acquired evenly for the plurality of nozzles 10, and the number of nozzles 10 for which the inspection signal is not acquired is reduced.

In a fifteenth modification, X types of inspections, that is, the first-type to the X-th type inspections, are performed as in the thirteenth modification. In the fifteenth modification, in response to receiving an inspection instruction signal, the controller 30 performs the processing according to the flowchart of FIG. 21B as in the thirteenth modification, or the flowchart of FIG. 22 as in the fourteenth modification.

Figure 23A:
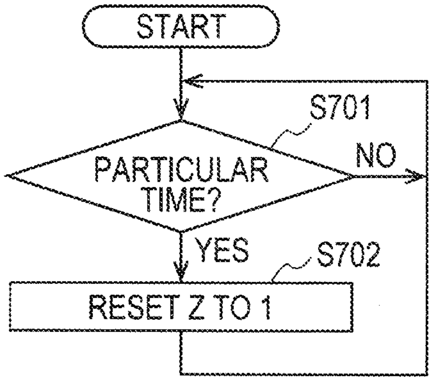
FIG. 23A is a flowchart showing a flow of processing performed in the printer in an example in which a variable Z is reset at each particular time.

In the fifteenth modification, while power is being supplied to the printer 1, the controller 30 performs the processing according to the flowchart of FIG. 23A. To explain in detail, the controller 30 waits until a particular time has come (S701: NO). When the particular time has come (S701: YES), the controller 30 resets the value of the variable Z to 1 (S702), and the processing returns to S701.

Thus, in the fifteenth modification, the variable Z is reset to 1 every time the particular time has come, the first-type inspection is performed when the inspection operation is performed for the first time in a cycle from the particular time to the next particular time, the second-type inspection is performed when the inspection operation is performed for the second time in the cycle, and then, the Z-th type inspection is performed when the inspection operation is performed for the Z-th time in the cycle.

In the fifteenth modification, a period from a particular time to the next particular time is set as one cycle, and the order of the nozzles for which the inspection signal is acquired is changed between the first-type inspection and the second-type inspection in this one cycle, whereby the inspection signal is acquired evenly for the plurality of nozzles 10. The order of the nozzles 10 for which the inspection signal is acquired is reset for each cycle.

In a sixteenth modification, X types of inspections, that is, the first-type to the X-th type inspections, are also performed as in the thirteenth modification. In the sixteenth modification, in response to receiving an inspection instruction signal, the controller 30 performs the processing according to the flowchart of FIG. 21B as in the thirteenth modification, or the flowchart of FIG. 22 as in the fourteenth modification.

Figure 23B:
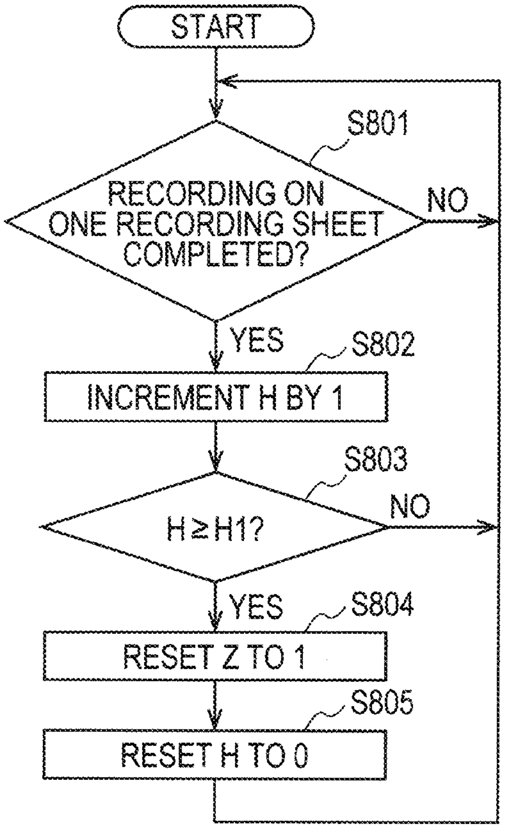
FIG. 23B is a flowchart showing a flow of processing performed in the printer in an example in which the variable Z is reset each time a particular number of sheets are printed.

In the sixteenth modification, while power is being supplied to the printer 1, the controller 30 performs the processing according to the flowchart of FIG. 23B. In the sixteenth modification, for example, a variable H described later is set to 0 at the time of the initial startup of the printer 1.

To explain the flowchart in FIG. 23B in detail, the controller 30 waits while recording on one sheet of recording sheet S is not completed (S801: NO). When recording on the one sheet of recording sheet S is completed (S801: YES), the controller 30 increments the value of the variable H by 1 (S802) and determines whether the value of the variable H is greater than or equal to a particular value H1 (S803). In a case where the value of the variable H is less than the particular value H1 (S803: NO), the processing returns to S801. In a case where the value of the variable H is greater than or equal to the particular value H1 (S803: YES), the controller 30 resets the variable Z to 1 (S804), resets the variable H to 0 (S805), and the processing returns to S801.

Thus, in the sixteenth modification, the variable Z is reset to 1 every time H1 sheets of recording sheet S are recorded, and a period during which H1 sheets of recording sheet S are recorded is set as one cycle, the first-type inspection is performed when the inspection operation is performed for the first time in this cycle, the second-type inspection is performed when the inspection operation is performed for the second time in the cycle, and then, the Z-th type inspection is performed when the inspection operation is performed for the Z-th time in the cycle.

In the sixteenth modification, the order of the nozzles for which the inspection signal is acquired is changed between the first-type inspection and the second-type inspection in the cycle in which H1 sheets of recording sheet S are recorded, whereby the inspection signals are acquired evenly for the plurality of nozzles 10. Further, the order of the nozzles 10 for which the inspection signal is acquired is reset for each cycle.

In a configuration in which the first-type inspection is performed when the inspection operation is performed for the first time in one cycle, and the second-type inspection is performed when the inspection operation is performed for the second time in the one cycle, the period from a particular time to the next particular time is set as one cycle in the fifteenth modification, and the period during which H1 sheets of recording sheet S are recorded is set as one cycle in the sixteenth modification. However, a period different from these periods may be used as one cycle.

In a seventeenth modification, as shown in FIG. 24, information about the number of times of occurrences of DC leakages is stored for each of the plurality of nozzles 10 of the inkjet head 4. In the seventeenth modification, in the first-type inspection and the second-type inspection, for example, the inspection signal is acquired for each of the plurality of nozzles 10 of the inkjet head 4 in the first order and the second order similar to any of the examples described above. In the seventeenth modification, the inspection signal is acquired for each of the nozzles 10 except for the nozzles 10 at which the number of times of occurrences of DC leakages is greater than or equal to a second number. FIG. 24 shows a case where the second number is five, and the inspection signal is acquired for each nozzle 10 except for the nozzle 10 with the nozzle number marked with “NO”, that is, for each nozzle 10 with the nozzle number marked with “YES”.

In the nozzles 10 at which the number of times of occurrences of leakages is large, a leakage is highly likely to occur in the subsequent inspection operation. Thus, in the seventeenth modification, the inspection signal is acquired in order for each nozzle 10 except for the nozzle 10 at which the number of times of occurrences of leakages is greater than or equal to the second number. This suppresses occurrences of leakages in the inspection operation.

In the above-described embodiment, first to ninth and fifteenth modifications, and so on, in a case where the DC leakage occurs during the execution of the first-type inspection, the second-type inspection is performed in the next inspection operation, whereas in a case where the AC leakage occurs during the execution of the first-type inspection, the same first-type inspection as the previous inspection operation is performed in the next inspection operation, but the present disclosure is not limited to this.

For example, in a case where either the DC leakage or the AC leakage occurs during the execution of the first-type inspection, the second-type inspection may be performed in the next inspection operation.

Alternatively, for example, in a case where the AC leakage occurs during the execution of the first-type inspection, the second-type inspection is performed in the next inspection operation, whereas in a case where the DC leakage occurs during the execution of the first-type inspection, the same first-type inspection as the previous inspection operation may be performed in the next inspection operation.

In the above embodiment, the printer 1 performs the suction purge as the purge, but the present disclosure is not limited to this. For example, a pressure pump that pressurizes the ink in the inkjet head 4 may be provided in a flow path and so on between the ink cartridge and the inkjet head 4. The pressure pump may be driven in a state where the plurality of nozzles 10 are covered with the cap 21, thereby performing a pressure purge for discharging the ink in the inkjet head 4. In this case, a combination of the cap 21 and the pressure pump is an example of “purge unit” of the present disclosure.

Further, both the suction purge performed by driving the suction pump 22 and the pressure purge performed by driving the pressure pump may be performed. In this case, a combination of the maintenance unit 8 and the pressure pump is an example of “purge unit” of the present disclosure.

In the above-described examples, the present disclosure is applied to the printer including a so-called serial head which ejects ink from the plurality of nozzles while moving in the scanning direction together with the carriage, but the present disclosure is not limited to this. For example, the present disclosure may be applied to a printer including a so-called line head extending over the entire length of the recording sheet in the scanning direction.

In the above-described examples, the present disclosure is applied to the printer that performs recording on the recording sheet S by ejecting ink from nozzles, but the present disclosure is not limited to this. The present disclosure may also be applied to a recording apparatus that records an image on a recording medium other than recording paper, such as a T-shirt, a sheet for outdoor advertising, a case of a portable terminal such as a smartphone, a corrugated cardboard, or a resin member. The present disclosure may also be applied to a liquid ejection apparatus that ejects liquid other than ink droplets, for example, resin or metal in a liquid state.

What is claimed is:

1. A liquid ejection apparatus comprising:

a head including a plurality of nozzles;

an inspection signal output circuit including an electrode, the inspection signal output circuit being configured to output an inspection signal indicating an electrical change in the electrode when the head is driven to eject liquid from a nozzle toward the electrode, the nozzle being among the plurality of nozzles; and a controller configured to perform an inspection operation sequentially for the plurality of nozzles, the inspection operation including driving the head to eject liquid from the nozzle toward the electrode, acquiring the inspection signal output from the inspection signal output circuit, and determining whether there is an abnormality in ejection of liquid in the nozzle based on the acquired inspection signal, the controller being configured to, as the inspection operation, perform:

a first-type inspection of acquiring the inspection signal in a first order for the plurality of nozzles; and a second-type inspection of acquiring the inspection signal in a second order for the plurality of nozzles, the second order being different from the first order.

2. The liquid ejection apparatus according to claim 1, further comprising a leakage signal output circuit configured to output a leakage signal indicating whether a leakage occurs, the leakage being that a current of a particular value or more flows between the head and the electrode, wherein the controller is configured to:

in a case where the leakage signal indicating that the leakage occurs is output from the leakage signal output circuit while performing the inspection operation, stop the inspection operation; and in a case where the leakage signal indicating that the leakage occurs is output from the leakage signal output circuit while performing the first-type inspection, perform the second-type inspection as the inspection operation that is performed following the first-type inspection.

3. The liquid ejection apparatus according to claim 1, further comprising a leakage signal output circuit configured to output a leakage signal indicating whether a leakage occurs, the leakage being that a current of a particular value or more flows between the head and the electrode, wherein the controller is configured to:

in a case where the leakage signal indicating that the leakage occurs is output from the leakage signal output circuit while performing the inspection operation, stop the inspection operation; and regardless of whether the leakage signal indicating that the leakage occurs is output from the leakage signal output circuit while performing the first-type inspection, perform the second-type inspection as the inspection operation that is performed following the first-type inspection.

4. The liquid ejection apparatus according to claim 1, wherein the plurality of nozzles include a first nozzle to an N-th nozzle, where N is an integer greater than or equal to 2; and wherein the controller is configured to:

in the inspection operation, perform the first-type inspection to an X-th type inspection, where X is an integer greater than or equal to 2 and less than or equal to N;

in the first-type inspection, acquire the inspection signal for the plurality of nozzles in the first order in which the inspection signal is acquired sequentially from the first nozzle to the N-th nozzle; and in a Z-th type inspection, acquire the inspection signal sequentially from a $[(Z-1)\times Y+1]$-th nozzle to the N-th nozzle, and then acquire the inspection signal sequentially from the first nozzle to a $[(Z-1)\times Y]$-th nozzle, where Y is an integer greater than or equal to 1 and satisfying a relation $[(X-1)\times Y+1]\leq N$, and Z is an integer greater than or equal to 2 and less than or equal to X.

5. The liquid ejection apparatus according to claim 1, wherein the controller is configured to:

when performing the inspection operation a first time in a particular cycle, perform the first-type inspection; and when performing the inspection operation a second time in the particular cycle, perform the second-type inspection.

6. The liquid ejection apparatus according to claim 1, further comprising:

a purge unit configured to perform purge of discharging liquid from the plurality of nozzles; and a leakage signal output circuit configured to output a leakage signal indicating whether a leakage occurs, the leakage being that a current of a particular value or more flows between the head and the electrode, wherein the controller is configured to:

in a case where the leakage signal indicating that the leakage occurs is output from the leakage signal output circuit while performing the inspection operation, stop the inspection operation;

when performing the inspection operation in a state where a particular time or more has elapsed after the purge is performed last by the purge unit, perform the first-type inspection; and when performing the inspection operation in a state where the particular time has not elapsed after the purge is performed last by the purge unit, perform the second-type inspection.

7. The liquid ejection apparatus according to claim 6, further comprising a cap configured to cover the plurality of nozzles, wherein the cap includes a lip arranged to surround a portion facing the plurality of nozzles in a state where the cap covers the plurality of nozzles, the lip protruding toward the head;

wherein the electrode is accommodated in the cap;

wherein the purge unit is configured to perform the purge of discharging liquid from the plurality of nozzles to the cap;

wherein the plurality of nozzles include a first nozzle and a second nozzle, the second nozzle being farther away from the lip than the first nozzle is in a state where the cap covers the plurality of nozzles; and wherein the controller is configured to:

in the first-type inspection, acquire the inspection signal for the plurality of nozzles in the first order in which the inspection signal for the first nozzle is acquired and then the inspection signal for the second nozzle is acquired; and in the second-type inspection, acquire the inspection signal for the plurality of nozzles in the second order in which the inspection signal for the second nozzle is acquired and then the inspection signal for the first nozzle is acquired.

8. The liquid ejection apparatus according to claim 6, further comprising a cap configured to cover the plurality of nozzles, wherein the electrode is accommodated in the cap;

wherein the cap has a discharge port for discharging liquid in the cap;

wherein the purge unit includes a suction pump connected to the discharge port;

wherein the plurality of nozzles include a first nozzle and a second nozzle, the second nozzle being farther away from the discharge port than the first nozzle is in a state where the cap covers the plurality of nozzles; and wherein the controller is configured to:

drive the suction pump in a state where the cap covers the plurality of nozzles to perform the purge of discharging liquid from the plurality of nozzles to the cap;

after the purge, drive the suction pump in a state where the cap does not cover the plurality of nozzles to perform suction of discharging liquid in the cap from the discharge port;

in the first-type inspection, acquire the inspection signal for the plurality of nozzles in the first order in which the inspection signal for the first nozzle is acquired and then the inspection signal for the second nozzle is acquired; and in the second-type inspection, acquire the inspection signal for the plurality of nozzles in the second order in which the inspection signal for the second nozzle is acquired and then the inspection signal for the first nozzle is acquired.

9. The liquid ejection apparatus according to claim 2, wherein the leakage signal output circuit includes:

a DC leakage signal output circuit configured to output a DC leakage signal indicating whether a DC leakage occurs, the DC leakage being that a current of the particular value or more flows continuously between the head and the electrode; and an AC leakage signal output circuit configured to output an AC leakage signal indicating whether an AC leakage occurs, the AC leakage being that a current of the particular value or more flows temporarily between the head and the electrode; and wherein the controller is configured to:

in a case where the DC leakage signal indicating that the DC leakage occurs is output from the DC leakage signal output circuit while performing the first-type inspection, perform the second-type inspection as the inspection operation that is performed following the first-type inspection.

10. The liquid ejection apparatus according to claim 9, wherein the controller is configured to:

in a case where the AC leakage signal indicating that the AC leakage occurs is output from the AC leakage signal output circuit while performing the first-type inspection and the DC leakage signal indicating that the DC leakage occurs is not output from the DC leakage signal output circuit, perform the first-type inspection as the inspection operation that is performed following the first-type inspection.

11. The liquid ejection apparatus according to claim 2, further comprising a memory, wherein the plurality of nozzles include a first nozzle and a second nozzle;

wherein the controller is configured to:

store, in the memory, information about a number of times of occurrence of the leakage for each of the plurality of nozzles;

in the first-type inspection, acquire the inspection signal for the plurality of nozzles in the first order in which the inspection signal is first acquired for the first nozzle; and in the second-type inspection, acquire the inspection signal for the plurality of nozzles in the second order in which the inspection signal is first acquired for the second nozzle, the number of times of occurrence of the leakage for the second nozzle being less than or equal to a first number.

12. The liquid ejection apparatus according to claim 2, further comprising a memory, wherein the controller is configured to:

store, in the memory, information about a number of times of occurrence of the leakage for each of the plurality of nozzles; and in the second-type inspection, acquire the inspection signal for the plurality of nozzles in the second order in which the inspection signal is acquired sequentially in ascending order of the number of times of occurrence of the leakage.

13. The liquid ejection apparatus according to claim 2, further comprising a memory, wherein the controller is configured to:

in the inspection operation, when the leakage signal indicating that the leakage occurs is output from the leakage signal output circuit, store, in the memory, information about at which nozzle the leakage has occurred; and in the second-type inspection, acquire the inspection signal for the plurality of nozzles in the second order in which the inspection signal is first acquired for a nozzle other than the nozzle at which the leakage has occurred in the first-type inspection.

14. The liquid ejection apparatus according to claim 2, further comprising a memory, wherein the controller is configured to:

in the inspection operation, when the leakage signal indicating that the leakage occurs is output from the leakage signal output circuit, store, in the memory, information about at which nozzle the leakage has occurred; and in the second-type inspection, acquire the inspection signal for the plurality of nozzles in the second order in which the inspection signal is first acquired for a nozzle for which the inspection signal is scheduled to be acquired a particular number after a leakage nozzle in the first order, the leakage nozzle being a nozzle at which the leakage has occurred in the first-type inspection, the particular number being greater than or equal to 2.

15. The liquid ejection apparatus according to claim 2, further comprising a memory, wherein the plurality of nozzles include:

a plurality of first nozzles configured to eject first liquid; and a plurality of second nozzles configured to eject second liquid of a type different from the first liquid; and wherein the controller is configured to:

store, in the memory, information of a first total number of times and information of a second total number of times, the first total number of times being a total of a number of times of occurrences of leakage at the plurality of first nozzles, the second total number of times being a total of a number of times of occurrences of leakage at the plurality of second nozzles;

in the second-type inspection, in a case where the first total number of times is less than the second total number of times, acquire the inspection signal for the plurality of nozzles in the second order in which the inspection signal is acquired for the plurality of first nozzles and then the inspection signal is acquired for the plurality of second nozzles; and in the second-type inspection, in a case where the second total number of times is less than the first total number of times, acquire the inspection signal for the plurality of nozzles in the second order in which the inspection signal is acquired for the plurality of second nozzles and then the inspection signal is acquired for the plurality of first nozzles.

16. The liquid ejection apparatus according to claim 2, further comprising a memory, wherein the head includes a nozzle surface in which the plurality of nozzles are arranged; and wherein the controller is configured to:

for each of a plurality of divided regions, store, in the memory, information of a total number of times of leakage that is a total of a number of times of occurrences of the leakage at nozzles located in a corresponding divided region, the plurality of divided regions being acquired by dividing the nozzle surface; and in the second-type inspection, acquire the inspection signal for the plurality of nozzles in the second order in which the inspection signal is first acquired for nozzles located in one of the plurality of divided regions for which the total number of times of leakage is smallest.

17. The liquid ejection apparatus according to claim 2, further comprising a memory, wherein the controller is configured to:

store, in the memory, information about a number of times of occurrences of the leakage for each of the plurality of nozzles; and in the inspection operation, in a case where there is a nozzle for which the number of times of occurrences of the leakage is greater than or equal to a particular number, acquire the inspection signal sequentially for other nozzles among the plurality of nozzles, the other nozzles being nozzles other than the nozzle for which the number of times of occurrences of the leakage is greater than or equal to the particular number.

18. The liquid ejection apparatus according to claim 2, further comprising a memory, wherein the plurality of nozzles include a first nozzle, a second nozzle, a third nozzle farther away from the first nozzle than the second nozzle is;

wherein the controller is configured to:

in the inspection operation, when the leakage signal indicating that the leakage occurs is output from the leakage signal output circuit, store, in the memory, information indicating at which nozzle the leakage has occurred;

in the first-type inspection, store, in the memory, information indicating that the leakage has occurred at the first nozzle; and in the second-type inspection that is performed following the first-type inspection, acquire the inspection signal for the plurality of nozzles in the second order in which the inspection signal is acquired for the third nozzle and then the inspection signal is acquired for the second nozzle.

19. The liquid ejection apparatus according to claim 2, wherein the plurality of nozzles include a plurality of first nozzles and a plurality of second nozzles;

wherein the liquid ejection apparatus further comprises:

a first cap configured to cover the plurality of first nozzles; and a second cap configured to cover the plurality of second nozzles; and wherein the electrode includes:

a first electrode accommodated in the first cap; and a second electrode accommodated in the second cap; and wherein the controller is configured to:

in the first-type inspection, acquire the inspection signal for the plurality of nozzles in the first order in which the inspection signal is acquired for the plurality of first nozzles and then the inspection signal is acquired for the plurality of second nozzles; and in a case where the leakage signal indicating that the leakage occurs at at least one of the plurality of first nozzles is output from the leakage signal output circuit in the first-type inspection, in the second-type inspection performed following the first-type inspection, acquire the inspection signal for the plurality of nozzles in the second order in which the inspection signal is acquired for the plurality of second nozzles and then the inspection signal is acquired for the plurality of first nozzles.

20. A liquid ejection apparatus comprising:

a head including at least a first nozzle and a second nozzle;

an inspection signal output circuit including an electrode, the inspection signal output circuit being configured to output an inspection signal indicating an electrical change in the electrode when the head is driven to eject liquid from a nozzle toward the electrode, the nozzle being the first nozzle or the second nozzle; and a controller configured to perform an inspection operation for each of the first nozzle and the second nozzle, the inspection operation including driving the head to eject liquid from the nozzle toward the electrode, acquiring the inspection signal output from the inspection signal output circuit, and determining whether there is an abnormality in ejection of liquid in the nozzle based on the acquired inspection signal, the controller being configured to, as the inspection operation, perform:

a first-type inspection of acquiring the inspection signal in a first order in which the inspection signal for the first nozzle is acquired and then the inspection signal for the second nozzle is acquired; and a second-type inspection of acquiring the inspection signal in a second order in which the inspection signal for the second nozzle is acquired and then the inspection signal for the first nozzle is acquired.

* * * * *